(12) United States Patent
Du

(10) Patent No.: US 10,796,456 B2
(45) Date of Patent: *Oct. 6, 2020

(54) PHOTOREALISTIC HUMAN HOLOGRAPHIC AUGMENTED REALITY COMMUNICATION WITH INTERACTIVE CONTROL IN REAL-TIME USING A CLUSTER OF SERVERS

(71) Applicant: Eliza Yingzi Du, Cupertino, CA (US)

(72) Inventor: Eliza Yingzi Du, Cupertino, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/153,755

(22) Filed: Oct. 6, 2018

(65) Prior Publication Data
US 2019/0073798 A1 Mar. 7, 2019

Related U.S. Application Data

(63) Continuation-in-part of application No. 15/665,295, filed on Jul. 31, 2017, now Pat. No. 10,162,308.
(Continued)

(51) Int. Cl.
*G06T 7/00* (2017.01)
*G06T 7/73* (2017.01)
*G06T 19/00* (2011.01)
*G06K 9/00* (2006.01)
*G06K 9/03* (2006.01)
(Continued)

(52) U.S. Cl.
CPC ............... *G06T 7/97* (2017.01); *G06K 9/00* (2013.01); *G06K 9/00335* (2013.01); *G06K 9/00671* (2013.01); *G06K 9/03* (2013.01); *G06N 20/00* (2019.01); *G06T 7/75* (2017.01); *G06T 11/00* (2013.01); *G06T 19/006* (2013.01);
(Continued)

(58) Field of Classification Search
None
See application file for complete search history.

(56) References Cited

U.S. PATENT DOCUMENTS

| | | | |
|---|---|---|---|
| 2010/0030578 A1* | 2/2010 | Siddique | G06Q 30/06 705/3 |
| 2016/0198097 A1* | 7/2016 | Yewdall | H04N 5/272 348/659 |
| 2017/0069124 A1* | 3/2017 | Tong | G06F 16/5854 |

* cited by examiner

*Primary Examiner* — Peter Hoang

(57) ABSTRACT

Disclosed herein are methods and systems for real-time holographic augmented reality image processing. The processing includes the steps of receiving, at a cluster of servers and from an image capturing component, real-time image data; extracting one or more objects or a scene from the real-time image data based on results from real-time adaptive learning and one or more object/scene extraction parameters; extracting one or more human objects from the real-time image data based on results from real-time adaptive human learning and one or more human extraction parameters, receiving augmented reality (AR) input data; and creating holographic AR image data by projecting, for each image, the extracted object or scene, the extracted human object, and the AR input data using a multi-layered mechanism based on projection parameters. The real-time adaptive learning comprises object learning, object recognition, object segmentation, scene learning, scene recognition, scene segmentation, or a combination thereof. The real-time adaptive human learning comprises human characteristic learning, human recognition, human segmentation, human body movement tracking, or a combination thereof.

24 Claims, 15 Drawing Sheets

Related U.S. Application Data which is a continuation-in-part of application No. 15/479,269, filed on Apr. 4, 2017, now Pat. No. 10,580,040.

(60) Provisional application No. 62/396,388, filed on Sep. 19, 2016, provisional application No. 62/317,554, filed on Apr. 3, 2016, provisional application No. 62/322,358, filed on Apr. 14, 2016.

(51) Int. Cl.
| | | |
|---|---|---|
| *G06N 3/08* | (2006.01) | |
| *H04L 29/08* | (2006.01) | |
| *G06N 20/00* | (2019.01) | |
| *G06T 11/00* | (2006.01) | |
| *G06N 7/00* | (2006.01) | |
| *G06N 5/00* | (2006.01) | |

(52) U.S. Cl.
CPC ............ *H04L 67/1002* (2013.01); *G06N 3/08* (2013.01); *G06N 5/003* (2013.01); *G06N 7/005* (2013.01)

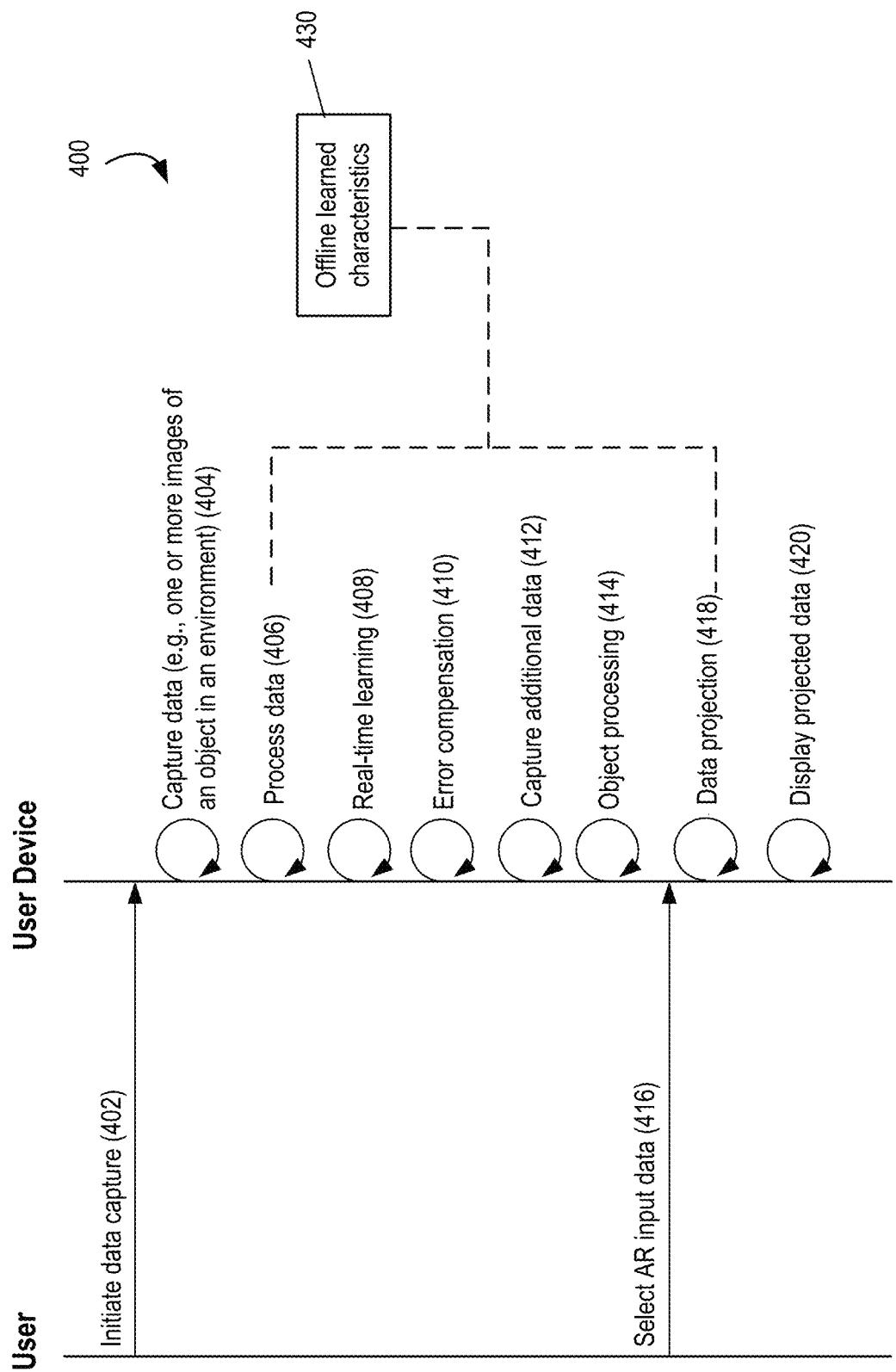

PHOTOREALISTIC HUMAN HOLOGRAPHIC AUGMENTED REALITY COMMUNICATION WITH INTERACTIVE CONTROL IN REAL-TIME USING A CLUSTER OF SERVERS

CROSS-REFERENCE TO RELATED APPLICATION

Continuation-in-part of application Ser. No. 15/665,295 filed on Jul. 31, 2017, which is a continuation-in-part of application Ser. No. 15/479,269, filed on Apr. 4, 2017.

TECHNICAL FIELD

The disclosure generally relates to systems, devices, servers, and methods for immersing real-time captured one or more objects (e.g., a physical object or a person) into a virtual world with interactive control from a human object via gesture, body movement, and/or facial expression. In particular, iterative adaptive learning based on artificial intelligence is performed of the data before some of the data is extracted and combined with AR input data to generated AR-related data content.

BACKGROUND

The current generation of real-time augmented reality (AR) based communication systems and methods are severely defective due to poor image quality or slow processing speed. For example, Apple Photobooth™ allows users to create photos or videos of themselves in a virtual environment. Google Hangout™, an audio and video conference platform, allows users to select background during a video conference session and allows users to wear exchangeable virtual items such as hats, glasses and mustache. However, such existing systems are crude and primitive from a visual perspective. In particularly, the holographic quality of human objects is very poor because the existing methods for extracting physical objects are insufficient to capture the more intricate characteristics and features of humans. For similar reasons, such methods also fail to integrate extracted human objects with a virtual environment. Often there are obvious and sometimes significant gaps and numerous imperfections at the edges around an extracted human object. Such defects are more pronounced where a virtual environment includes moving elements or when users are moving.

On the other hand, human observers are much more sensitive to extraction errors or inaccuracies of human bodies (in particular the faces) than other objects/scenes, especially when the images are of the observers themselves. Furthermore, the existing systems and methods do not allow user to naturally interact with the virtual world. Such defects severely comprise user experience in real-time AR based communications. Ways for overcoming these defects are needed.

SUMMARY

The current disclosure provides methods and systems that fundamentally change many of the aspects of AR-based image processing and offer significant improvement over existing AR-based image processing and communication methods and systems.

In one aspect, disclosed herein are a real-time holographic augmented reality image processing methods. For example, a sample method can include the steps of receiving, at a cluster of servers and from an image capturing component, real-time image data; extracting one or more objects or a scene from the real-time image data based on results from real-time adaptive learning and one or more object/scene extraction parameters; extracting one or more human objects from the real-time image data based on results from real-time adaptive human learning and one or more human extraction parameters, receiving augmented reality (AR) input data; and creating holographic AR image data by projecting, for each image, the extracted object or scene, the extracted human object, and the AR input data using a multi-layered mechanism based on projection parameters. The real-time adaptive learning comprises object learning, object recognition, object segmentation, scene learning, scene recognition, scene segmentation, or a combination thereof. The real-time adaptive human learning comprises human characteristic learning, human recognition, human segmentation, human body movement tracking, or a combination thereof. Here the cluster of servers have at least one server. In some embodiments, a server can be part of a user device. In some embodiments, the cluster of servers can be located at a same physical location connected via network. In some embodiments, the cluster of servers can be located at different physical locations and connected via network. In some embodiments, the cluster of servers can further be divided into multiple clusters of servers.

In some embodiments, the method can further comprise continuing to receive additional images constituting the real-time image data while applying real-time error compensation to the image capture component based on the real-time adaptive learning of the image data; and performing the real-time adaptive learning of the additional image data to render updated real-time learning results.

In some embodiments, the method can further comprise updating real-time learning results based on offline object data, offline human identification data, or real-time adaptive learning results from a previous time point.

In some embodiments, the offline human identification data comprise data for physical feature detection, data for gesture recognition, data for facial recognition, or data for movement recognition.

In some embodiments, the multi-layered mechanism comprises: separating each pixel in a holographic AR image into multiple layers; and determining each pixel of the holographic AR image based on corresponding pixels in the extracted object or scene, the extracted human object, and the augmented reality (AR) input data based on the projection parameters.

In some embodiments, the method can further comprise separating each pixel in the extracted object or scene and the extracted human object into multiple layers.

In some embodiments, each pixel of the AR input data is separated into multiple layers.

In some embodiments, each the one or more object/scene extraction parameters and the one or more human extraction parameters are the same.

In some embodiments, each the projection parameters comprise a depth relation, a transparency relation, a positional relation, a visual relation, human interactive control information interpreted from human gesture, a human body movement, a human facial expression, or a combination thereof.

In one aspect, disclosed herein is a computer system comprising: one or more processors; and a non-transitory computer-readable medium including one or more sequences of instructions that, when executed by one or more processors, cause the processors to perform multiple operations. For example, the multiple operations comprise receiving, at a cluster of servers and from an image capturing component, real-time image data; extracting one or more objects or a scene from the real-time image data based on results from real-time adaptive learning and one or more object/scene extraction parameters, wherein the real-time adaptive learning comprises object learning, object recognition, object segmentation, scene learning, scene recognition, scene segmentation, or a combination thereof; extracting one or more human objects from the real-time image data based on results from real-time adaptive human learning and one or more human extraction parameters, wherein the real-time adaptive human learning comprises human characteristic learning, human recognition, human segmentation, human body movement tracking, or a combination thereof; receiving augmented reality (AR) input data; and creating holographic AR image data by projecting, for each image, the extracted object or scene, the extracted human object, and the AR input data using a multi-layered mechanism based on projection parameters. Here the cluster of servers have at least one server. In some embodiments, a server can be part of a user device. In some embodiments, the cluster of servers can be located at a same physical location connected via network. In some embodiments, the cluster of servers can be located at different physical locations and connected via network. In some embodiments, the cluster of servers can further be divided into multiple clusters of servers.

In one aspect, disclosed herein is a non-transitory computer-readable medium including one or more sequences of instructions that, when executed by one or more processors, cause the processors to perform multiple operations. For example, the operations comprise receiving, at a cluster of servers and from an image capturing component, real-time image data; extracting one or more objects or a scene from the real-time image data based on results from real-time adaptive learning and one or more object/scene extraction parameters, wherein the real-time adaptive learning comprises object learning, object recognition, object segmentation, scene learning, scene recognition, scene segmentation, or a combination thereof; extracting one or more human objects from the real-time image data based on results from real-time adaptive human learning and one or more human extraction parameters, wherein the real-time adaptive human learning comprises human characteristic learning, human recognition, human segmentation, human body movement tracking, or a combination thereof; receiving augmented reality (AR) input data; and creating holographic AR image data by projecting, for each image, the extracted object or scene, the extracted human object, and the AR input data using a multi-layered mechanism based on projection parameters. Here the cluster of servers have at least one server. In some embodiments, a server can be part of a user device. In some embodiments, the cluster of servers can be located at a same physical location connected via network. In some embodiments, the cluster of servers can be located at different physical locations and connected via network. In some embodiments, the cluster of servers can further be divided into multiple clusters of servers.

In some embodiments, the operations further comprises: continuing to receive additional images constituting the real-time image data while applying real-time error compensation to the image capture component based on the real-time adaptive learning of the image data; and performing the real-time adaptive learning of the additional image data to render updated real-time learning results.

In some embodiments, the operations further comprises: updating real-time learning results based on offline object data, offline human identification data, or real-time adaptive learning results from a previous time point.

In some embodiments, the offline human identification data comprise data for physical feature detection, data for gesture recognition, data for facial recognition, or data for movement recognition.

In some embodiments, the multi-layered mechanism comprises: separating each pixel in a holographic AR image into multiple layers; and determining each pixel of the holographic AR image based on corresponding pixels in the extracted object or scene, the extracted human object, and the augmented reality (AR) input data based on the projection parameters.

In some embodiments, the multi-layered mechanism further comprises: separating each pixel in the extracted object or scene and the extracted human object into multiple layers.

In some embodiments, each pixel of the AR input data is separated into multiple layers.

In some embodiments, the one or more object/scene extraction parameters and the one or more human extraction parameters are the same.

In some embodiments, the projection parameters comprise a depth relation, a transparency relation, a positional relation, a visual relation, human interactive control information interpreted from human gesture, a human body movement, a human facial expression, or a combination thereof.

It would be understood that any embodiments disclosed herein can be applied, when applicable, in any aspect of the invention, alone or in any combination.

Details of one or more implementations are set forth in the accompanying drawings and the description below. Other features, aspects, and potential advantages will be apparent from the description and drawings, and from the claims.

DESCRIPTION OF DRAWINGS

Those of skill in the art will understand that the drawings, described below, are for illustrative purposes only. The drawings are not intended to limit the scope of the present teachings in any way.

FIG. 4A depicts example interactions between a user and a user device for generating AR-based real-time image data

Like reference symbols in the various drawings indicate like elements.

DETAILED DESCRIPTION

Overview

Figure 1A:
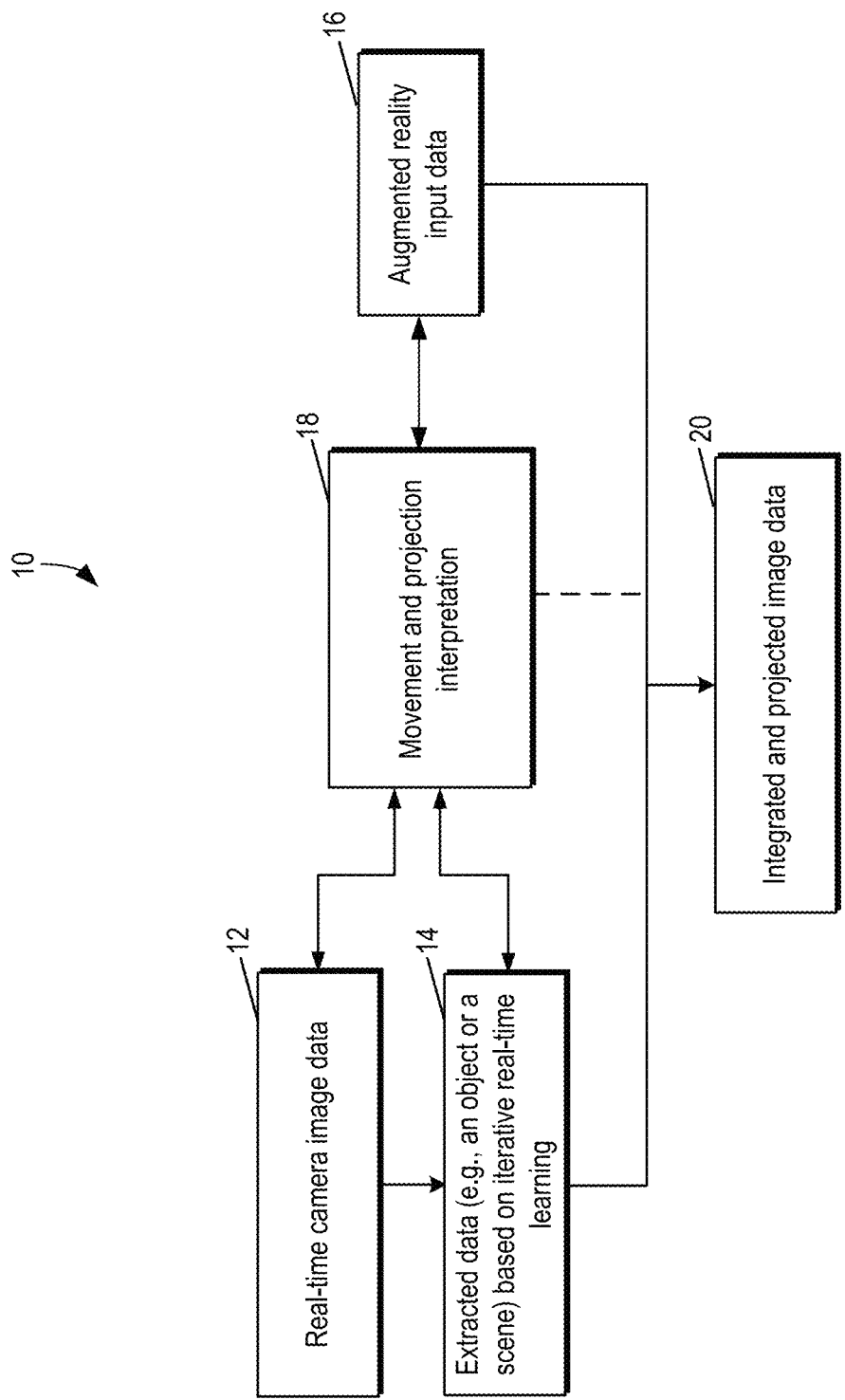
FIG. 1A depicts a block diagram illustrating information flow in an example system for performing AR-based real-time image data processing.

FIG. 1A illustrates elements that are present in an exemplary AR-based real-time image and data processing system 10. Data such as images of a real life object are captured while the real life object is physically located in an actual environment (e.g., block 12). In some embodiments, additional data are captured, including but not limited to audio data and sensor data. The captured images are then processed in real-time to extract image information of the real life object (e.g., block 14) in user device or a cluster of servers. Augmented reality (AR) input data (e.g., block 16) can be obtained previously or concurrently constructed while the real life object is being extracted either at a user device or a cluster of servers. Here, the AR input data include virtual reality information or information that is processed from the data captured. One or more extracted real life objects, including general objects, scene, and human objects, are then combined with the AR input data to generate AR-based real-time image data. Optional secondary data such as non-visual signals or advertisement element can be added to any elements in system 10. The entire process can take place in real-time while images of the real life object are being captured, although in some embodiments, certain AR input data such as virtual environment elements can be obtained and provided before-hand.

As disclosed herein, the term "real-time" refers to functionalities being performed without little or no delay in time. For example, image processing occurs in real-time when an image undergoes noise reduction as soon as or shortly after the image has been captured. Similarly, image extraction occurs in real-time as soon as or shortly after the captured image has undergone one or more processing steps. For example, image processing can occur at the same time when additional images are being collected. Here, the term processing can be any analysis or manipulation done to the images. As disclosed herein, a process or a portion thereof is real-time so long as there is no undue delay. Where there is delay, in some embodiments, the delay can be within seconds or milliseconds or microseconds or nanoseconds. In some embodiments, the delay may be caused by hardware limitations on computer processing speed, or data transfer speed, or network communication capacity.

As disclosed herein, the terms "real life object" and "object" are sometimes used interchangeably. Here, the real life object can include a person. In some embodiments, the real life object can be an object such as a table, or an animal such as a dog. In some embodiments, the real life object can be the user of the AR-based system. In some embodiments, the real life object is an operator of the computer device and controls one or more of the functionalities including image capture. In some embodiments, the real life object is the subject from which/whom data are captured using a data collection device such as a camera, a microphone, a sensor and etc.

As disclosed herein, the terms "actual environment" and "scene" can be used interchangeably. They refer to information other than the real life object, in particular the physical surrounding wherein the object is located. In some embodiments, when a specific person is the intended object, other people captured in images or videos can be treated as part of the actual environment or scene.

As disclosed herein, the term "images" can be used to refer to separate photos taken at discontinuous time points or image frames in a video. Unless otherwise specified, the terms "images" and "video" can be used interchangeably. A video is effectively a collection of multiple images that are captured continuously. For some image capture devices, all images have same type (e.g., commercially available digital cameras); some image capture devices, it can capture multiple kinds of image types, such as Microsoft Kinect can capture depth images, near-infrared images, and color images at the same time.

As disclosed herein, the terms "data" and "signals" can be used interchangeably. For example, they can include image, audio, video, sensor, text, spatial, geographical, or any other information associated with the real life object. They also include metadata or other embedded information that reflect a state of the real life object. They can further include data that are indirectly associated with the real life object, for example, information such as images or videos that reflect the geolocation of the real life object. As disclosed herein, "signals" and "data" can include internal and/or external data. Here, internal data refer to those collected during the real-time capture of the real life object in its actual environment (also referred to as a scene in an image), including visual, audio and other types of information. External data refer to content beyond those collected in real-time, including but not limited to data already stored on a local user device, data from another user device (accessible via network connection), data stored on a server (e.g., including advertisement elements stored on an advertisement provisioning server), or data retrieved in real-time using network collection. Most examples disclosed herein refer to images, which, however, should not in any way limit the scope of the invention.

As disclosed herein, the term "augmented reality input data" or "AR input data" refer to data or information that differ from those captured in real-time. For example, AR input data can include a virtual environment, an altered version of the real-time captured data, a person or object, or any other data that is being captured in real-time via other cameras. Here, a virtual environment can include any type of previously generated data.

As disclosed herein "secondary signals" are signals or data in other than those reflecting the real life object itself. Secondary signals can also include internal or external data. In some embodiments, secondary signals include non-visual signals such as audio sound track or external audio files. In some embodiments, secondary signals include advertisement elements that can be incorporated with the extracted real life object, the virtual environment, or the final integrated images or videos.

As disclosed herein, the terms "photorealistic holographic AR communication" or "holographic AR communication"

or "AR communication" refer to a communication system and/or method that is capable of extracting real life objects (including human objects), immersing them into virtual environment, and allowing real life objects to interact with virtual objects based on one or more system settings, one or more user preferences, and/or one or more user interactive control information.

At block 12, data (e.g., images or audio) of a real life object is captured, using, for example, a camera and optionally a microphone or a sensor. In some embodiments, the camera is an integral part of the user device such as a computer, a cell phone, or video recorder. In some embodiments, the camera is an external hardware component that can be connected to the user device. In some embodiments, the user device is a network-enabled camera. Preferably, the camera is a depth camera. In some embodiment, the image/audio capturing device includes a set of cameras. As disclosed herein, the user device should be equipped with a CPU/GPU processor, a camera, a microphone, a display, a speaker, a communication unit, and a storage. It includes but is not limited to a desktop computer, a laptop computer, a smartphone device, a personal digital associates, a network-enabled camera, a tablet, an AR glass, an AR hamlet, a VR glass, a smart TV, and etc. The camera includes but is not limited to a 2D, 3D or 4D camera, a color camera, a gray scale camera, a regular RGB camera, an infrared (IR) camera, a near infrared (NIR) camera, a thermal camera, a multiple spectrum camera, a hyperspectral camera, a 360 degree camera etc. A microphone can be any device that is capable of detecting and capturing audio information. A sensor can be any component, module, or subsystem that can detect events or changes in its environment and send the information to another device (e.g., a computer processor). Exemplary events and changes include but are not limited to those associated with temperatures, heartbeat, breathing, blood pressure, pressure, speed, orientation, and etc. As disclosed herein, methods and systems for processing images are described by way of example. However, one of skill in art would understand that the methods and systems can be applied to other types of data. Additionally, other types of data can be processed, separately or in combination with images data to create the AR-based data as disclosed herein. An example is combination of sound data with image data. Another example is combination of sensor data with image data. As disclosed herein, sensor data comprise vibration data, temperature data, pressure data, orientation data, proximity data, and etc.

In some embodiments, the real life object is a person. In some embodiments, the real life object is an animal or an object. In some embodiments, a plurality of images is taken of the real life object. In some embodiments, data are captured continuously; e.g., a video is taken, which includes many images taken over a period of time. As disclosed herein, the device for capturing data of the real life object is accessible to the real life object or a user of the device.

As disclosed herein, the real life object can be in any environment when data (e.g., images) are being captured. Unlike systems currently in use, there are no special requirements for the environment for image capturing. For example, a background of a uniform or near uniform color is not needed. A static background with little no motion or illumination change is also not needed. As disclosed herein, the background can also include one or more human objects (static or moving). In most embodiments, images of the real life object are capture as is when the real life object is in its actual physical environment. In some embodiments, images of the real life object are taken while the real life object is carrying out regular activities.

At block 14, while the images are being capture, image information of the real life object or scene is extracted. Exaction of information uses a comprehensive mechanism, based on a wide range of information, such as a characteristic of the real life object, or the scene, a characteristic difference between the real life object and the scene. In some embodiments, the comprehensive mechanism is based on information gained from real-time learning. In some embodiments, learning results from one or more previous time points are applied during extraction. In some embodiments, the comprehensive mechanism is based on pre-learned or existing information such as offline learned object data for specific human features including features that reflecting the emotional state of a person. In some embodiments, extraction is done based on gesture and body language information learned from the real-time image data.

In some embodiments, extraction is performed by separating the real life object from its actual environment, based on one or more differences in a characteristic between the real life object and the scene (e.g., the actual environment). In some embodiments, the characteristic can be a visual characteristic, including but not limited to a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof.

In some embodiments, the visual characteristic comprises a three-dimensional spatial characteristic. In some embodiments, the visual characteristic comprises a continuous time movement/change characteristic.

In some embodiments, the characteristic can be a real-time learned or a pre-learned feature relating to the real life object or the actual environment. A real-time learned or pre-learned characteristic includes but is not limited to, for example, color, shape, edge, light reflectance, light illuminance, motion, depth, material, contrast, or combinations thereof.

In some embodiments, extraction of the real life object is done on an image-by-image basis. This also applies to video extraction, which is done on a frame-by-frame basis. In some embodiments, multiple images are processed in parallel at the same time.

At block 16, augmented reality (AR) input data are provided. For example, AR input data can include a virtual environment, an altered version of the real-time captured data; and a person, object or any other data that is being captured in real-time via other cameras. In some embodiments, the AR input data can be provided prior to image extraction or even image capture. For example, multiple types of virtual environment can be organized in one or more libraries. In some embodiments, the libraries can be downloaded and saved locally on a device. In some embodiments, the libraries can be stored on a server which can be accessed by a device; for example, based on a user preference or system setting. In some embodiments, the AR input data such as a virtual environment can be constructed concurrently as the data are being captured, or when the object or scene is being extracted.

In some embodiments, the AR input data can be captured in real-time via another camera. For example, a participant of an AR communication who is located in San Francisco may use one or more real-time captured street images of Paris as the virtual environment. In some embodiments, the AR input data can be captured and constructed in real-time based on real-time views. of several cameras. For example, the participant in San Francisco may use one or more real-time captured street images of Paris in combination with one or more real-time captured images of a famous celebrity in London to show that the participant is interacting with the celebrity on a street of Paris. Here the virtual environment includes the real-time camera images from the celebrity in London and the Paris street scene. In some embodiments, the AR input data can be an output from another AR communication system. For example, the celebrity in London may output his AR communication as if he is physically located on a Paris street. The participant in San Francisco can use the AR communication from the celebrity as the virtual environment to show that he is interacting with the celebrity on the Paris street in real-time. In the last scenario, the virtual environment for the participant is the real-time AR communication from the celebrity.

In some embodiments, the AR input data such as the virtual environment is different from the actual environment. In some embodiments, the virtual environment is a modified version of the actual environment. In any embodiments, images for constructing the virtual environment can be modified image characteristics including but not limited size, shape, image quality, color, perspective, light, visual effect, or combinations thereof.

In some embodiments, the AR input data such as the virtual environment can be the same as the actual environment, but one or more characteristics can be changed. For example, the actual environment can be processed to enhance certain elements to render a virtual environment. Additionally, the actual environment can be modified to enhance the image quality to render a virtual environment. In some embodiments, one or more elements of the actual environment are altered in visual characteristics such as color, shape, size, light and etc.

In some embodiments, the virtual environment can be the same as the actual environment, but its relations with the real life object are altered. In some embodiments, the real life object becomes much smaller or much larger in scale relative to its environment, as in the movie Alice in Wonderland. For example, a person who is drinking tea in the captured images can be shown within a tea cup in the final integrated image while the other elements of the environment remain unchanged.

In some embodiments, a server can provide collections virtual environment to a user. The virtual environment can be divided into different categories based on the themes present therein. Exemplary themes include but are not limited to nature, animals, space, movie, architecture, culture, travel, and etc. A user's selection for particular types of themes can be stored in user preference.

In some embodiments, the AR input data such as the virtual environment comprises an image. In some embodiments, the AR input data such as the virtual environment comprises a video. In some embodiments, the AR input data such as the virtual environment comprises a 3D model. In some embodiments, the AR input data such as the virtual environment comprises an animation (such as a GIF format image). In some embodiments, the AR input data such as multiple virtual environments can be included, each treated as a separate element during image or video integration. In some embodiments, the AR input data can include internal or external data, including image, audio, video, text, spatial, geographical, or any other type of information. In some embodiments, the AR input data can include types of multiple types. For example, audio information, sensor data or other information (such as advertisement information) can be included in addition to image information relating to the virtual environment. In some embodiments, the AR input data can include non-visual signals such as audio signals, for example, sound information collected when capturing the image information of the real life object. In some embodiments, the AR input data include internal or existing audio signals or external audio signals. In some embodiments, internal or existing audio signals are obtained from the captured images or videos and subject to further processing (e.g., voice recognition and subsequent language translation). In some embodiments, audio signals of a video can be processed for enhanced sound effects. For example, ambient noises can be removed to enhance the voice of a real life object (e.g., a speaker during a conference call). In some embodiments, special sound effects can be added to a desirable voice. For example, a voice can be rendered to have a three-dimensional hollow effects to mimic sounds in an echoing environment.

At block 18, integration data are provided for combining and projecting the extracted data with the AR input data in a user device or a cluster of servers. As disclosed herein, the terms "integration," "combination," "projection," and "synthesis" can be used interchangeable, unless otherwise specified. In some embodiments, the integration data include information concerning movement and/or projection of the extracted object or scene and the AR input data. In some embodiments, the integration data include two-dimensional, three-dimensional, still or time series data projection for projecting the extracted object or scene and the AR input data into a space (e.g., field of view in a final integrated image). For example, gesture and body language information can be obtained from the real-time image data to extrapolate contextual information. In some embodiments, the integration data include preset system criteria or interactive control commands from the gesture/body language/facial expression, and etc. As disclosed herein, a novel multi-layered projection/integration approach is used to combine the extracted object/scene and AR input data, as will be described in connection with FIG. 3A. In some embodiments, the integration data provide specification for projecting the combined data into one or more camera views. In some embodiments, external audio signals can be added to existing audio signals. For example, a user can choose to play a background music during a video conference call. In some embodiments, external audio signals are used to replace existing audio signals (e.g., audio signals collected while capturing images of the real life object). Such audio signals (external or internal) can be associated with any elements in the system (e.g., block 12, 14, 16 and 20) in a user device or a cluster of servers. In some embodiments, the audio signals are associated with virtual environment. In some embodiments, the audio signals can be added to integrated images.

At block 20, the extracted real life object and the AR input data are integrated or combined to render images or videos of a real life object combined with the AR input data (e.g., a virtual environment) in a user device or a cluster of servers. To achieve integration, relations between the extracted real life object and with the AR input data (e.g., a virtual environment) will be defined. As described above, real-time learned movement and projection interpretation can be used to define such relations.

In some embodiments, the system can automatically provide additional guidelines to specify relations between extracted object and the AR input data, for example, based on a predefined user preference or system setting. In some embodiments, the relations are entirely defined automatically by the system based on information from the extracted real life object and the AR input data (e.g., a virtual environment). In some embodiments, a user can provide real-time adjustment to re-define or modify the relations between the extracted real life object and AR input data (e.g., a virtual environment) during the integration process.

In some embodiments, relations between the extracted real life object and AR input data (e.g., a virtual environment) include depth relation. For example, the extracted real life object can be partially or entirely "in front of" or "behind" an element of the virtual environment. In some embodiments, the extracted real life object can be partially or entirely "in front of" one element but partially or entirely "behind" another element of the same virtual environment. In some embodiments, the depth relations between all or a portion of the extracted real life object changes temporally with time progression between different images. In some embodiments, the depth relations between all or a portion of the extracted real life object changes spatially over different elements in the same image.

In some embodiments, relations between the extracted real life object AR input data (e.g., a virtual environment) include a transparency relation. For example, the extracted real life object can be partially or entirely transparent relative to an element of the virtual environment. In some embodiments, the transparency relations between all or a portion of the extracted real life object changes temporally with time progression between different images. In some embodiments, the transparency relations between all or a portion of the extracted real life object changes spatially over different elements in the same image.

In some embodiments, the relations are defined concurrently as image extraction and/or virtual environment construction. In some embodiments, the relations are defined once image information of the real life object is extracted and the virtual environment is constructed.

In some embodiments, the relations can be changed due to a view point change. In some embodiments, the view point can be changed constantly due to the user preference, or system setting.

Figure 1B:
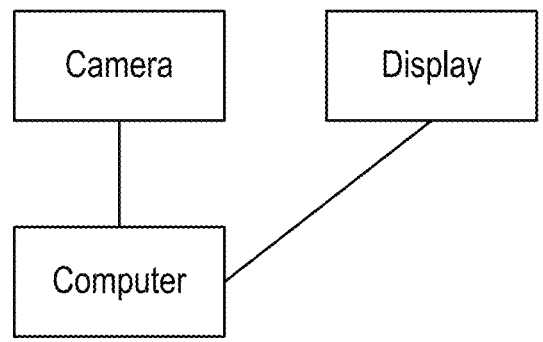
FIG. 1B depicts an example system for AR-based real-time image data processing.
Figure 1C:
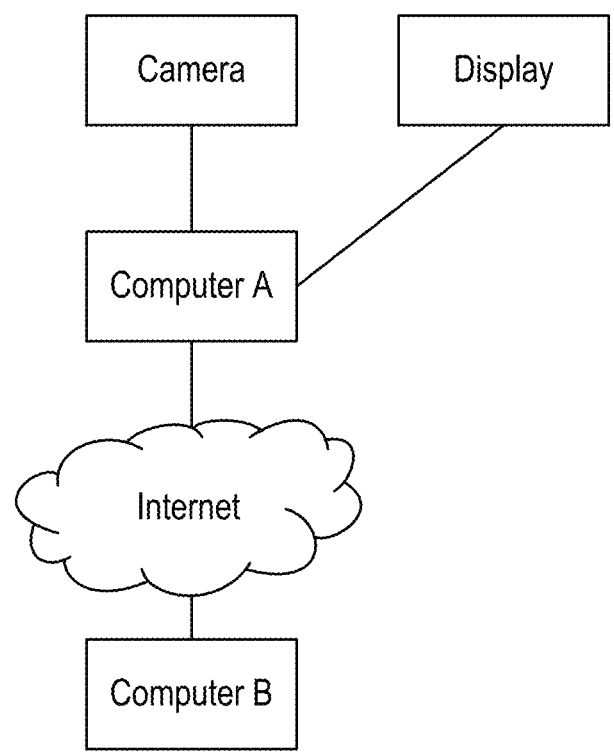
FIG. 1C depicts an example system for AR-based real-time image data processing.

FIGS. 1B and 1C illustrate two exemplary system set up for generating AR-based real-time image data. In FIG. 1B, a sample system includes a computer device, a camera and a display. For example, the camera can be a 3D camera or 2D cameras. The camera acquire image and send it to computer. The computer performs real-time processing of the image and send the processed image to display.

In FIG. 1C, a sample system includes a first computer device, a camera, and a display, which communicates with a second computer device through internet connection. For example, the first computer is connected with a camera and display. The camera includes but is not limited to a 2D, 3D or 4D camera, a color camera, a gray scale camera, a regular RGB camera, an infrared (IR) camera, a near infrared (NIR) camera, a thermal camera, a multiple spectrum camera, a hyperspectral camera, a 360 degree camera etc. The camera acquire image and send it to computer. The first computer (e.g., computer A) performs real-time processing of the image and send the processed image to display. In some embodiments, the first computer sends the processed image through internet to the second computer (e.g., computer B).

In some embodiments, the system in FIG. 1B can be used to process image data. In some embodiments, the system in FIG. 1C can process image data and communicate the processed data to another computer device, possible in another system. In some embodiments, the camera and display can be integral parts of a computer device (e.g., computer A or computer B). In some embodiments, the camera and display are not part of the computer device, but can communicate with the computer device via wired or wireless connection.

Many commercially available electronic devices can be used, including but not limited to a smart phone, a smartphone, a tablet device, a laptop computer, a personal digital associates, a network-enabled camera, a tablet, a VR device such as a VR glass, a smart TV, a gaming system, a wearable device (e.g., smart watch, smart glasses, etc.), an AR-based device such as an AR glass or an AR hamlet, and/or an MR-based system. Exemplary AR devices include AR glass goggles (e.g., Mircosoft Hololens, Epson® Moverio glasses, etc.), and AR headset (e.g., Oakley airwave, Meta, etc.). Exemplary MR system includes Microsoft Kinect in combination with an Xbox and a display; Intel Realsense camera in combination with a computer, and etc. Exemplary smartphone based AR systems can include virtually any smart phones that are equipped with a camera/mic and other sensors.

Exemplary System

Figure 1D:
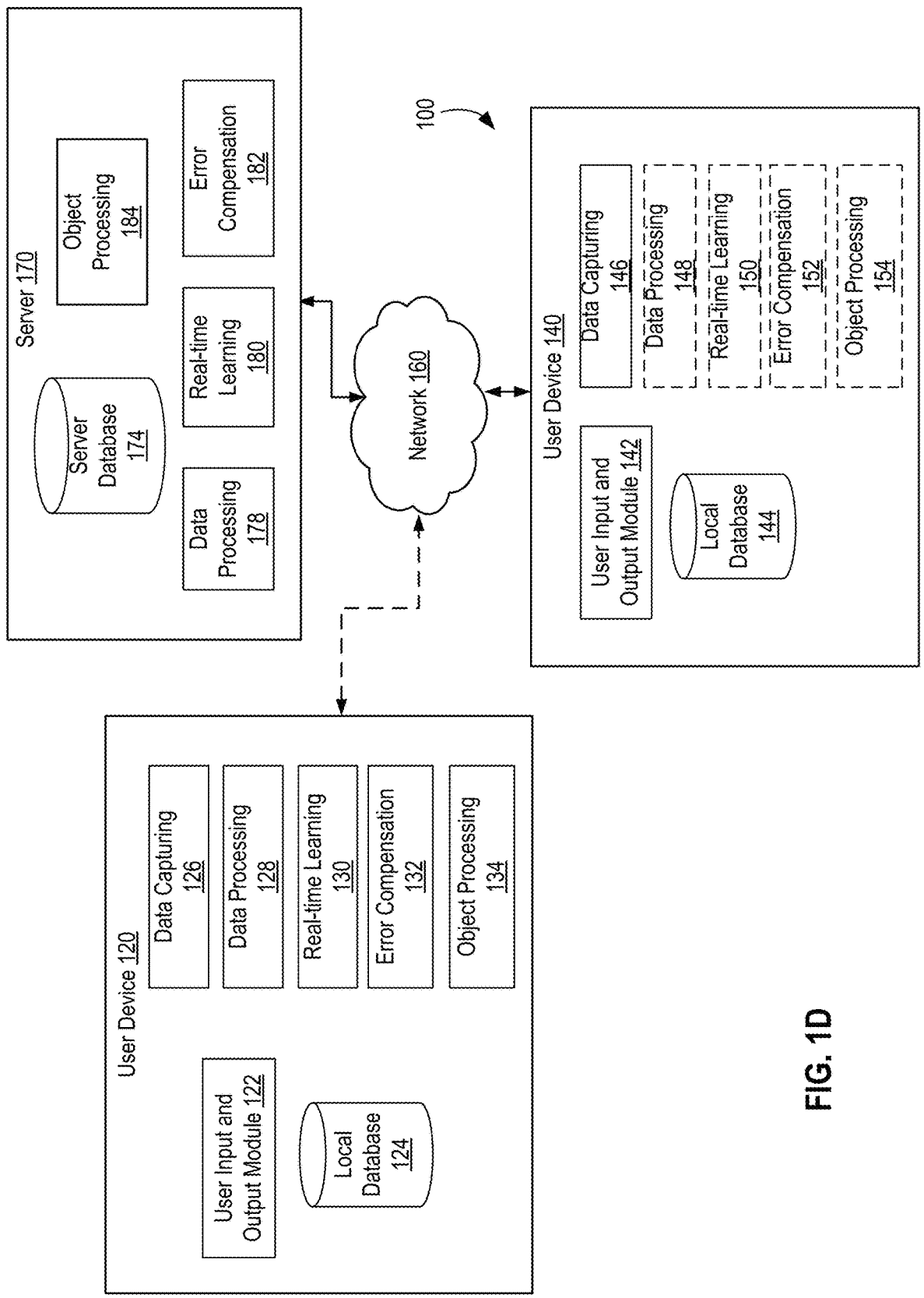
FIG. 1D depicts an example system for AR-based real-time image data processing.

FIG. 1D illustrates an exemplary system 100 for carrying out the functionalities disclosed herein. Here multiple user devices (e.g., 120 and 140) are connected to a server device 170 via network 160. Information processing takes place on one or more of the devices illustrated.

User device 120 depicts a local device (e.g., a device that is accessible to a real life object) equipped with multiple functionalities. In particular, user device 120 comprises a user input and output (I/O) module 122, a local database 124, and multiple functional modules (e.g., modules 126, 128, 130, 132 and 134) for capturing images of a real life object in a scene, extracting the real life object or scene based on real-time learning, combining information from the extracted the real life object or scene with some AR-based input data (such as a virtual environment) to generate AR-based real-time image data.

In some embodiments, user device 120 includes a user input and output module (I/O module) 122. For example, I/O module 122 can receive user input to user device 120 and present output from user device 102, using text, audio, video, motion, and/or haptic output mechanisms. For example, I/O module 122 can receive a gesture input, a body movement, or a voice input from a user to initiate the methods for generating AR-based real-time image data. In some embodiments, such input can be used to change the course of the methods by specifying in real-time user preference or selecting a system preference. In some embodiments, I/O module 122 is also configured to detect and track eye movement, facial expression and etc. Also for example, I/O module 122 receive touch input from a touch sensitive display of user device 120. In other embodiments, I/O module 122 can be coupled to other input devices, such as a camera, a keyboard, mouse, a monitor, touch sensitive screen, a speaker and etc., and receive user input from these devices. In some embodiments, I/O module 122 includes a camera, a keyboard, mouse, a monitor, touch sensitive screen, a speaker and etc. as an integral part of I/O module 122 or user device 120. In some embodiments, user device 120 can receive multiple types of user input. In some embodiments, I/O module 122 or user device 120 further includes one or more sensor devices for collecting information such as heartbeat, blood pressure, orientation, pressure, proximity, acceleration, or allowing a user to receive a physical experience such as touching (e.g., a user can receive a remote handshake in real time).

In some embodiments, I/O module 122 can also present audio, visual, motion, and/or haptic output to the user. For example, I/O module 122 display integrated images or videos on a monitor a user of device 120. In some embodiments, I/O module 122 can present GUIs that enable or support the functionality of one or more of the real-time image and signal processing methods/systems described herein, including but not limited to data capturing module 126, data processing module 128, real-time learning module 130, error compensation module 132, and object processing module 134. In some embodiments, the user input and output module includes a plurality of menu commands, each corresponding to the functionality of one or more of the query processing modules.

In some embodiments, I/O module 122 allows a user to locate information that is needed for image processing. In embodiments, menu options can be provided such that a user can select one or more options to initiate one or more functions. For example, a user can click an icon to start image capturing process. Also for example, multiple categories of virtual environment images can be provided via menu options.

In some embodiments, a user may use I/O module 122 to request information that is available either on the local user device 120 or can be obtained via network connection from service device 170 or another user device 140. For example, I/O module 122 can allow a user to use voice command to request AR input data such as a certain type of virtual environment (e.g., images of a European medieval castle). Once the images are delivered (either locally or via network connection), a user can request that the images be processed to construct a virtual environment.

In some embodiments, a user may use I/O module 122 to manage various functional modules. For example, a user can request via use I/O module 122 to change AR input data such as the virtual environment while a real-time communication is in process. A user can do so by select a menu option or type in a command discretely without interrupting the communication.

When methods/systems disclosed herein are used for image or video processing and editing, a user can use any type of input to direct and control the process via I/O module 122.

In some embodiments, user device 120 further comprises a local database 124. For example, local database 124 can store captured data such as images, partially or fully processed images (e.g., extracted real life object and images for virtual environment), or partially or fully integrated images. In some embodiments, local database 124 stores user specific information; for example, a user can store information of one or more preferred virtual environment for generating AR-based real-time data. In some embodiments, local database 124 stores information retrieved from another device or a server. In some embodiments, local database 124 stores information retrieved in real-time from internet searches.

In some embodiments, local database 124 sends data to and receives data from one or more of the functional modules, including but not limited to data capturing module 126, data discovery module 128, real-time learning module 130, error compensation module 132, and object processing module.

In some embodiments, user device 120 comprises data capturing module 126. For example, data capturing module 126 can include an image capturing device such as a camera. In some embodiments, the camera is depth enabled. In some embodiments, two or more cameras are used. In some embodiments, a built-in or an external microphone can be used for audio collection. In some embodiments, data capturing module 126 captures multiple images. In some embodiments, data capturing module 126 can capture multiple images and fuse them together for example to create an animated image. In some embodiments, data capturing module 126 captures a video continuously. In some embodiments, data capturing module 126 captures sensor data by using one or more sensors associated with device 120.

As disclosed herein, data capturing module 126 captures images of a real life object in the actual environment where the real life object is physically located. In some embodiments, the real life object is a user of user device 120. In some embodiments, the user is not the real life object, but controls user device 120 to capture images of an object that is accessible to signal capturing module 126. For example, the real life object can be a celebrity who is being photographed by a user operating data capturing module 126.

The methods and systems disclosed herein are advantageous because they do not require a real life object to be in a specific type of environment to aid image processing.

In some embodiments, user device 120 comprises a data processing module 128. Data processing module 128 can receive the real-time data, from I/O module 122, data capture module 126, or local database 124. In some embodiments, data processing module 128 can perform standard data processing algorithms such as noise reduction or signal enhancement. In some embodiments, data processing module 128 can performs data discovery and extract information from the data received in real-time. For example, data in each type can be analyzed to identify information such as human feature patterns (e.g., face, iris, body, gesture and etc.), voice patterns, bio-status, or any other physical or non-physical features of an object.

In some embodiments, data processing module 128 can evaluate and analyze each type of real-time data separately (e.g., visual, audio or sensor). In some embodiments, data processing module 128 can evaluate and analyze multiple type of real-time data at the same time (e.g., visual and sensor data can be used to detect onset of a heart attack).

In some embodiments, user device 120 comprises a real-time learning module 130. In some embodiments, real-time learning is triggered once data capture is initiated. In some embodiments, real-time object learning module 130 performs learning of characteristics of an object and the environment in real-time. In some embodiments, real-time learning comprises identifying boundaries between the object and its environment, for example, based on their differences in relative locations within the image, contrast, light, color, thermal properties, and etc. In some embodiments, image data are collected using a depth-enabled camera and the depth information is used to separate the object into background and foreground.

In some embodiments, real-time object learning module 130 can perform real-time object recognition. For example, object recognition comprises separating a person from the environment. In some embodiments, object recognition includes detecting different body parts of a person. In some embodiments, object recognition also includes associating certain characteristics with body parts of the person. For example, hands of a person can often associate with movements and tend to interact with other objects/people and the environment. As such, outlines of the hands are more likely to form boundaries of a person, in contrast to other body parts such as face, chest, or torso.

In some embodiments, real-time object learning module 130 can perform segmentation analysis. For example, segmentation can segment objects/people from the real-life environment in real-time based on one or more pre-set criteria.

In some embodiments, real-time object learning module 130 can perform real-time learning using pre-learned information. For example, pre-existing patterns of objects and scene can be used as starting points before further real-time learning.

In some embodiments, the object learning, object recognition, and segmentation functions are highly related and can take place concurrently. In particular, the results from one of the real-time learning can affect the outcome of another. As disclosed herein, a real-time adaptive learning process is developed to optimize learning and analysis about the environment, object recognition, and segmentation (FIG. 2B).

In some embodiments, user device 120 comprises an error compensation module 132. As disclosed herein, error compensation module 132 can adjust in real-time and optimize the performance of a data collection/capturing component (e.g., a camera, a microphone or a sensor). Error compensation module 132 will use the real-time learning result to compensate the camera error for the extraction, but not to change the real-time data characteristics. For example, if real-time learning module 130 determines that the light is too dark, the image can be adjusted to enhance light sensitivity during the extraction process. For example, 3D camera may not provide accurate in depth information about dark colored objects. Error compensation module 132 can compensate such depth errors based on object characteristics or region continuity. In some embodiments, 3D camera may not provide accurate in depth information about fast moving objects. Error compensation module 132 can compensate such depth error of moving objects based on object characteristics, region continuity, or object moving characteristics. In some embodiments, the infrared camera may not provide accurate data for a bright reflectance object. Error compensation module 132 can compensate the infrared-related errors about the bright reflectance object based on object characteristics or region continuity. In some embodiments, error-compensated images can be used as references for further real-time object learning. In some embodiments, results from data processing module 128 can also be used for error compensation. In some embodiments, error compensation module 132 can perform adjustment and optimization for any hardware and/or software component, including, for example, adjusting settings of a camera in response to changes in lighting conditions.

The functionalities of data capturing module 126, data processing module 128, real-time learning module 130, and error compensation module 132 share many similarities and, in some embodiments, two of more of these modules can be combined.

In some embodiments, user device 120 comprises an object processing module 134. Object processing module 134 extracts a real life object from images by separating image information of the real life object from its actual environment. Separation is achieved based on information from real-time learning module 130. In some embodiments, raw images captured by data capture module 126 are used. In some embodiments, images captured by data capture module 126 are first processed to improve data quality (e.g., through noise reduction by data processing module 128). As disclosed herein, object extraction can take place concurrently with data processing, error compensation, real-time learning while image data are being continuously collected.

The extraction utilizes a comprehensive characteristic-based mechanism, including artificial intelligence based mechanisms. The comprehensive characteristic-based mechanism recognizes one or more differences in a particular characteristic between the real life object and the actual environment. For example, a characteristic can include and is not limited to a visual characteristic of the real life object or the actual environment captured in the video clip, a real-time learned characteristic of the real life object or the actual environment, or a pre-learned feature relating to the real life object or the actual environment. In some embodiments, a visual characteristic can include but is not limited to comprises a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof. In some embodiments, the spatial characteristic comprises a three-dimensional spatial characteristic.

In some embodiments, a real-time learned characteristic includes but is not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof. The learning method can include linear regression, decision tree, support vector machine, K-nearest neighbors, K-means, Bayes network, logistic regression, feature point-based learning, neural network, hidden Markov chain, or combinations thereof. The learning can be supervised, partially supervised, or unsupervised.

In some embodiments, deep structure learning with multiple hidden layers can be used. The deep learning can be supervised, partially supervised, or unsupervised. Exemplary deep structure learning methods can include but are not limited to deep neural networks, deep belief networks, recurrent neural networks, hybrid of these deep structures, and hybrid of the deep structures with other pattern recognition methods. Due to its deep structure and highly non-linear characteristics, sometimes it is challenging to interpret what was learned, what characteristics are more prominent, how the learned characteristics would reflect the physical characteristics of an object. Here, learned parameters from the deep learning are also referred to as object characteristics.

An extraction process as disclosed herein can be completed in one round or in multiple rounds. In some embodiments, object processing module 134 performs a round of rough extraction first before carrying out one or more additional rounds of fine extraction. For example, rough extraction can trace an outline for the real life object while fine extraction can refine the edges separating the real life object and its actual environment. In some embodiments, one or more rounds of fine extraction can also identify a region within the outline of the real life object that is in fact part of the environment and subsequently remove the region from the real life object.

In some embodiments, object processing module 134 combines extracted object information with augment reality input data to generate real-time AR-enhanced data content. As disclosed, the AR input data include virtual reality information or information that is processed from the data captured. The process for combining the extracted information with AR input data will be explained in more details in connection with FIGS. 2A and 2B. In the case of image data, the combination process is also called image integration. In some embodiments, user device 120 comprises a separate integration module. As illustrated in detail in connection with FIG. 3A, integration can occur on a pixel-by-pixel basis for both efficiency and accuracy.

In some embodiments, object processing module 134 can create and modify the AR input data (e.g., a virtual environment) for subsequent image integration. For example, object processing module 134 can construct a virtual environment based on one or more images stored in local database 124. Object processing module 134 can also receive a pre-constructed virtual environment from a server via network connection. The virtual environment can be two-dimensional or three-dimensional. A virtual environment can include features that are not present in the images on which the virtual environment is based. For example, object processing module 134 can alter or adjust one or more elements in the virtual environment by modifying the corresponding images. In some embodiments, such modifications or adjustments are made based on one or more features of the real life object such that the extracted real life object and virtual environment can be more effectively integrated. An exemplary modification or adjustment includes but is not limited to scaling, change of orientation, change of shape, change of color, image quality adjustment (e.g., exposure, brightness, shadow, highlight, or contrast), and etc. The modification or adjustment can be made locally on individual elements within the virtual environment or globally on the entire virtual environment. In some embodiments, a virtual environment can be different from the actual environment. In some embodiments, a virtual environment can be the same as the actual environment with one or more elements in the virtual environment being modification for subsequent image integration.

As disclosed herein, information (e.g., data or results of analysis) can be shared among data capturing module 126, data processing module 128, real-time learning module 130 error compensation module 132, and object processing module 134. For example, after error compensation, image data obtained by data capturing module 126 affect the results from real-time learning module 130, which can then affect the results from objection processing module 134. For example, results associated with object learning, recognition, and segmentation can be improved due to improved image quality, which will improve the quality of object extraction.

In some embodiments, pre-defined user preference and system settings can be applied to specify or limit the functionalities of any of the functional modules disclosed herein.

In some embodiments, data capturing module 126, data processing module 128, real-time learning model 130, error compensation module 132, and/or object processing model 134 are not performed in a user device, rather they are performed in a cluster of servers. In some embodiments, local database 124 is hosted in the cluster of servers. In some embodiments, local database 124 is not used at all and all data was saved only on the cluster of servers. In some embodiments, the cluster of servers can have only one server. In some embodiments, the cluster of servers can have multiple servers.

In some embodiments, exemplary system 100 further comprises user device 140. In some embodiments, user device 140 can have the same functional modules as user device 120; e.g., user input and output module 142, local database 144, data capturing module 146, data processing module 148, real-time learning module 150, error compensation module 152, and object processing module 154. When a functional module is present, it can be implemented similarly as in user device 140 or according to any applicable known technology.

In some embodiments, user device can have fewer functional modules and instead relies on a server 170 to provide one or more functionalities. As illustrated in FIG. 1D, other than the data capturing module 146, the other functional modules, including data processing module 148, real-time learning module 150, error compensation module 152, and objection processing module 154, can be optional to user device 140. Effectively, these functionalities can be split between user device 140 and server 170 in any combination. For example, user device 140 can transmit captured images to server 170 for object processing (e.g., object extraction). In some embodiments, extracted real life object is integrated with a virtual environment on server 170. In some embodiments, extracted real life object can be transmitted back to user device to be integrated with AR input data such as a virtual environment. In some embodiments, a user can choose to provide a customized virtual environment. For example, user device can transmitting a selected virtual environment to server 170 before subsequent image integration takes place on server 170. Although not depicted, it would be understood that any known input/output device or component, such as those disclosed in connection with user device 120 and user device 140, can be used by server 170.

In some embodiments, data capturing module 146, data processing module 148, real-time learning model 150, error compensation module 152, and/or object processing model 154 are not performed in a user device, rather they were performed in a cluster of servers. In some embodiments, local database 144 was hosted in the cluster of servers. In some embodiments, local database 144 is not used at all and all data was saved only on the cluster of servers. In some embodiments, the cluster of servers can have only one server. In some embodiments, the cluster of servers can have multiple servers.

In some embodiments, a user can choose to turn on or off functionalities. For example, a user can elect to communicate with another in the actual environment where the user is physically located. For example, when communicating with a family member who is away, a user can choose to display the actual home environment without any alteration. The user can do so by leaving on only signal capturing module 146 while turning off the other functional modules. Additionally, a user can choose to turn on any of the remaining functional module.

In some embodiments, exemplary system 100 further comprises a server 170, Server 170 communicates with one or more user devices and include functional modules such as server database 174, data processing module 178, real-time learning module 180, error compensation module 180, error compensation module 182, object processing module 184, or variations thereof. In some embodiments, data processing module 178, real-time learning module 180, error compensation module 182, object processing module 184 are similar to those disclosed herein in connection with user device 120 or user device 140. In some embodiments, these modules may perform differently on server 170 due to the server's enhanced computing power and storage space in comparison to a user device. For example, integration can take place in parallel in a higher number of pixels than a user device would allow.

Figure 2A:
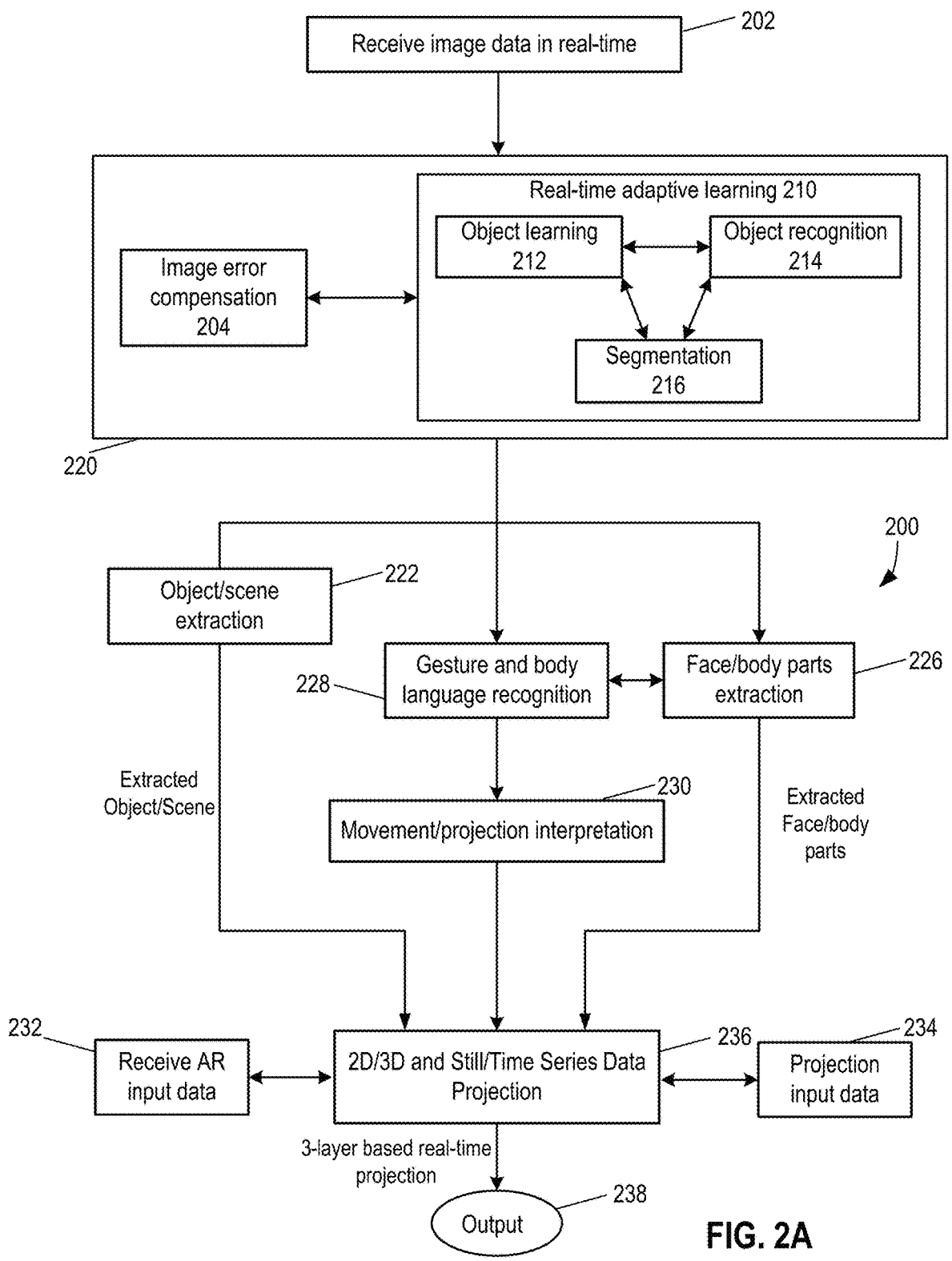
FIG. 2A depicts an example process for generating AR-based real-time image data.
Figure 2B:
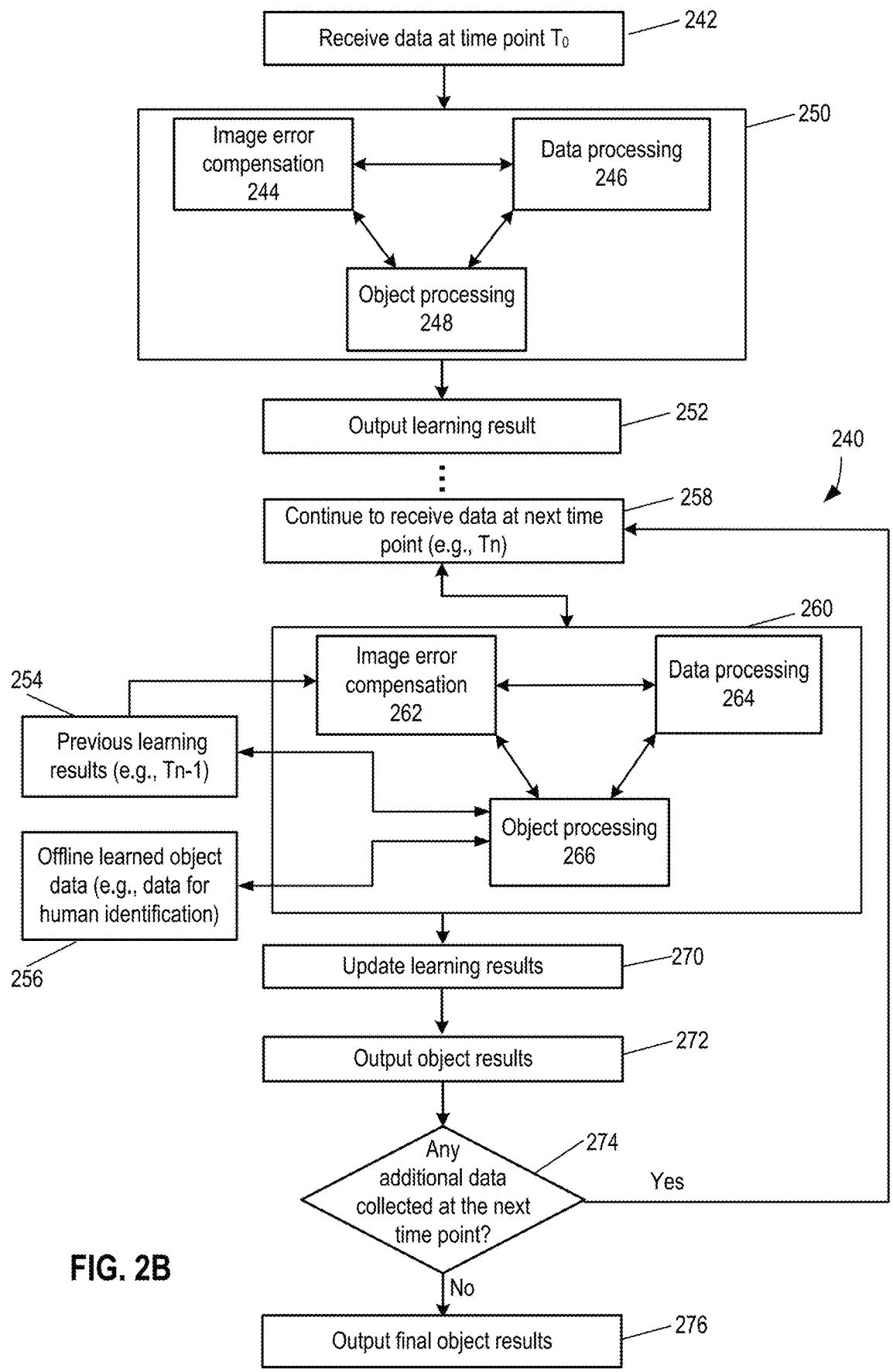
FIG. 2B depicts example steps and system of iterative real-time learning for generating AR-based real-time image data.

FIG. 2A depicts an example process for generating AR-based real-time image data. Exemplary embodiment 200 illustrates how real-time image data is processed in real-time via error compensation and adaptive learning before the object or scene is extracted and subject to further processing. In some embodiments, embodiment 200 also illustrates how the real-life objects and human objects are extracted in parallel in order to perform more accurate extraction of human objects, while reserving more accurate relations between human objects and general objects extracted in real-time. The extracted and further processed data are then combined with AR input data to generate AR-based real-time image data based on projection parameters. Here, three separate kind of learnings were processed for human objects: one is performed at step 222, where human objects were treated as general objects; the second is performed at step 226, where specially designed human objected based learning and process is performed; the third is performed at step 228, where human gesture, body movement, and facial expression were learned and recognized. In projection process at step 236, the extraction data are fused and integrated into the projection process.

At step 202, image data is captured in real-time, for example, by data capturing module 128 using a camera device. The captured image data can be saved in local database 124 or directly passed onto different functional module for processing. In some embodiments, the capture being captured comprises additional types of signals such as audio data or sensor data.

At step 204, the captured data undergo processing to improve data quality. At this step, data undergo special processing to compensate for errors. For example, 3D camera may not provide accurate in depth information about dark colored objects. In another example, 3D camera may not provide accurate in depth information about fast moving objects. Sometimes, depth-related errors can result in unknown depth value. Sometimes, errors can result in dramatic depth value variation from one pixel to another (or from one small group of clusters to another) in the region. In some embodiments, the processing at this step is carried out by error compensation module 132. For example, the error compensation module can detect the camera depth errors based on these characteristics and then compensate the depth errors by bridging the gaps based on object characteristics, region continuity characteristics, or object moving characteristics. For example, some infrared cameras camera may not provide accurate data for a bright reflectance object. As a result, the image heat map can have unknown values or randomly value changing areas. The error compensation module can compensate the infrared information based on object characteristics or region continuity. For example, some RGB video cameras can have dramatic color/intensity change when the cameras sense some environmental light changes and perform automatic dynamic color/intensity adjustment on output images. However, the inconsistency of color/intensity in consecutive time-images often can result in errors in extraction. At step 204, he error correction module can detect this kind of camera errors via time-continuity of the data. The error correction module can compensate this kind of camera errors by compensating the unnecessary changes due to the automatic camera dynamic range change based on the scene characteristics and time and special-based continuity.

In some embodiments, the error compensated images can be used as references for further real-time object learning. Note the error compensation results would not change the original real-time data. Rather, the error compensated images are saved as a separate set of data. In some embodiment, error compensation can be as middle transitory result for the next iterative processing and is not saved in the system permanently. The purpose of this step is mainly data quality compensation; for example, by compensating false, inaccurate or faulty data to improve subsequent processing.

At step 210, data from the processing step 204 can be subjected to real-time adaptive learning. Real-time learning can include multiple aspects; such as object learning 212, object recognition 214, or segmentation 216.

At step 212, real-time object learning methods are applied to learn characteristics of the real-time data to detect objects and scene in real-time. In some embodiments, the processing at this step is carried out by real-time learning module 130. For example, real-time learning comprises identifying boundaries between the object and its environment, based on their differences in relative locations within the image, contrast, light, color, thermal properties, and etc. In some embodiments, image data are collected using a depth-enabled camera and the depth information is used to separate the object into background and foreground for real-time learning. From there, the real-time learning module can learn about the object changes across consecutive time line. In some embodiments, depth-based approach can be acquired through 3D camera depth information. In some embodiments, using consecutive video images can construct 3D depth of the objects. In some embodiments, the real-time learning module can learn about the key feature points in the real-time data and from the key feature points to learn about the object characteristics. Example key-feature points/lines/region-based learning includes but is not limited to SIFT (scale-invariant feature transform) approach or SIFT-like approaches (e.g., SURF (speeded up robust features), Gabor feature points, etc.) Another example key feature points and line feature-based approach is SLAM (simultaneous localization and mapping) or SLAM-like approaches. In some embodiments, deep structure learning can be used. Sometimes, it can be challenging to interpret what is learned, what characteristics are more prominent, and/or how the learned characteristics would reflect the physical characteristics of an object using the deep structure learning approaches. As disclosed herein, the learned parameters are called learned object characteristics. In some embodiments, multiple recognition methods are fused to improve the recognition results.

At step 214, the processed image data can be analyzed for object recognition. Steps 214 and 212 differ in that only object characteristics are learned at step 212, while at step 214, the learned object characteristics from step 212 are analyzed (e.g., classified, clusters, and/or recognition. Note in some embodiments, step 212 and step 214 can be combined to constitute object learning and recognition process or just simply called object recognition process.

As disclosed herein, object recognition at step 214 comprises separating an object (including a person) from the environment. In some embodiments, object recognition includes group multiple regions to be a candidate object area based on matching the data characteristics with the object characteristics. In some embodiments, characteristics learned at step 212 can be used to match the potential data to candidate objects for object recognition. For example, SIFT or SIFT-like feature points can be used to recognize objects. In some embodiments, simple region-based separation along with unsupervised learning can be used to perform object matching between consecutive-time images. In some embodiments, SLAM or SLAM like features can be used to match objects in the real-time data. In some embodiments, object recognition can include detection of human objects. In some embodiments, object recognition can also include associating certain characteristics with body parts of the person. For example, hands of a person can often associate with movements and tend to interact with other objects/people and the environment. As such, outlines of the hands are more likely to form boundaries of a person, in contrast to other body parts such as face, chest, or torso. In some embodiments, offline data (e.g., existing patterns of known objects) are used to facilitate object recognition. In some embodiments, infrared camera or near-infrared camera can be used to provide heat map-like image of the real-time data, which can provide information to separate human objects from environment projects since human objects often have a range of temperature, and human skins have special infrared or near-infrared light absorption/reflectance characteristics that can be used to separate human objects from other objects. At the same time, different kinds of objects may have different characteristics under infrared or near infrared light, which can be used to match the data characteristics acquired in real-time with object characteristics. In some embodiments, deep structure learning can be used in object recognition. In some embodiments, multiple recognition methods were fused to improve the recognition results.

At step 216, the processed image data can be subjected to segmentation processing. For example, objects/people from the real-life environment can be segmented into portions or sections in real-time based on recognition results and/or pre-set criteria. For example, the pre-set criteria can include but are not limited to user preference, system default settings, and/or real-time learned criteria based the interactive feedback from the user. For example, it is possible to obtain recognized a human object at step 214. Segmentation can help prioritize analysis of data. For example, portions or sections that include a complete dark background can undergo quick cursive analysis, while the portions or sections including an object of interest would undergo more precise and detailed analysis.

In some embodiments, real-time adaptive learning 210 is an iterative and an interactive process. In some embodiments, learning results from a prior time point can be applied to a subsequent time point. In some embodiments, learning results from one aspect can affect the outcome of another aspect of the analysis.

In some embodiments, steps 202 through 220 can occur in parallel and affect each other's results. Additional details concerning iterative and interactive aspect are depicted in FIG. 2B and will be described in subsequent part of the disclosure.

The image error compensation block 204 will use the real-time learning result from the block 210 to compensate the camera error. At the same time, the image error compensation result can be used in object learning step 212, recognition step 214, and segmentation step 216. In some embodiments, the camera error correction step, object learning step 212, object recognition step 214, and segmentation step 216 can also be included into the same iteration process. For example, at iteration N, camera error correction can be the status N. This corrected result can be used in next iteration learning of step/process 210 and to provide (N+1)th learning status for the camera correction in (N+1)th iteration to generate the camera error correction status N+1. In some embodiments, camera error correction step 204 can be included a iteration process different from the object learning step 212, object recognition step 214, and segmentation step 216. For example, at iteration N, camera error correction can be the status N. This corrected result would be used in next X iterations of learning (X>1) of 210 and to provide (N+1)th learning status for the camera correction in (N+1)th iteration to generate the camera error correction status N+1. For another example, at iteration N, camera error correction can be the status N. This corrected result can be re-iterated within the camera error compensation step for another Y iterations (Y>1) and output the N+Y iteration results for Real-time adaptive learning 210 in next X iterations of learning (X>=1) at step 210 and to provide next learning status for camera correction.

In some embodiments, object learning step 212, recognition step 214, and segmentation step 216 are focusing on learning the characteristics of the background environment.

At step 222, an object or scene can be extracted from the processed and learned image data. For example, a real life object can be extracted from images by separating image information of the real life object from its actual environment, based on a comprehensive characteristic-based mechanism, including artificial intelligence based mechanisms. The comprehensive characteristic-based mechanism recognizes one or more differences in a particular characteristic between the real life object and the actual environment. For example, a characteristic can include and is not limited to a visual characteristic of the real life object or the actual environment captured in the images, a real-time learned characteristic of the real life object or the actual environment, or a pre-learned feature relating to the real life object or the actual environment. In some embodiments, a visual characteristic can include but is not limited to comprises a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof. In some embodiments, the spatial characteristic comprises a three-dimensional spatial characteristic. In some embodiments, step 222 and step 216 can differ significantly. For example, step 222 attends to much more details of the boundaries of extracting objects to ensure the extraction accuracy; for example, by taking into consideration boundary characteristics, region continuity, extraction parameters and etc. Step 226 can also differ from step 216; for example, in some embodiments, step 226 attends to much more details of the boundaries of extracting human objects to ensure the extraction accuracy by taking a lot of consideration of the human boundary characteristics, human region continuity, and the human extraction parameters. In some embodiments, step 222 and step 226 can differ significantly. For example, the method at step 226 focuses on human object characteristics and performs the learning, error compensation and extraction at a much more detailed level based on specially learned human related characteristics such as body, head, face, hair, hand, and etc.

In some embodiments, a real-time learned characteristic includes but is not limited to color, shape, edge, light reflectance, light illuminance, exposure, brightness, shadow, highlight, contrast, motion, depth, material, or combinations thereof. In some embodiments, a pre-learned feature also includes but is not limited to color, shape, edge, light reflectance, light illuminance, exposure, brightness, shadow, highlight, contrast, motion, depth, material or combinations thereof. In some embodiments, a real-time learned characteristics may not be easily mapped to object physical characteristics due to the nonlinearity of the learning process, especially when deep structure learning approaches were used.

An extraction process as disclosed herein can be completed in one round or in multiple rounds. For example, rough extraction can trace an outline for the real life object while fine extraction can refine the edges separating the real life object and its actual environment. In some embodiments, one or more rounds of fine extraction can also identify a region within the outline of the real life object that is in fact part of the environment and subsequently remove the region from the real life object.

In some embodiments, the objects/scene are extracted at step 222 based on extraction parameters that can be from a pre-defined user preference or system setting, such as objects within certain depth region, objects located within certain spatial areas, objects with certain characteristics, certain kinds of objects, certain objects, objects with certain relationship to the human object(s) in real-time data, etc.

In some embodiments, fine extraction can go to sub-pixel level. In some embodiments, edge detection was performed in proper separating the object boundaries. Example edge detection methods are Sobel edge detection, Canny edge detection, fuzzy logic-based edge detection methods, etc.

In some embodiments, the object extraction is based on the subtraction of the extraction of the learned background environments at step 210. In other words, in these embodiments, the adaptive learning in step 210 can be focused on learning the background environment (scene), and the step 222 is first to extract the background environment based on the learning results at step 210 and then subtract the real-data from the extracted background environment to get the extracted object areas.

Note, at step 222, the object can include one or more human objects. However, since step 222 uses generalized learning approach (or one-for-all extraction approach), the extracted human object can often be very rough and does not satisfy the accuracy requirements.

At step 226, the extracted data are further processed to recognize more detailed features such as face, body parts of human objects. Here, offline data of known features of human objects can be used. In some embodiments, face and/or body parts detection is based on object recognition results. In some embodiments, step 226 and step 222 can differ significantly. For example, the goal of step 226 is to focus on human objects extraction treatment. As disclosed herein, both step 226 and step 222 can have access to the original real-time data and adaptive learning results. However, step 226 would apply image error compensation to the human objects. It can be understood that step 222 can include a one-for-all extraction method for all objects; while a much more refined and much more focused human object extract method is implemented at step 226. To further ensure the accuracy of human object extraction, the extraction of each part of the body of the human object can be treated differently at step 226 based on characteristics of each human object part and needs for image error compensation. For example, for face/head, hair is often the most challenging part in extraction. For example, hair characteristics including hair boundary characteristics are specially weighted in the extraction process of human head. Furthermore, the image error compensation results in the learning process would especially emphasize in human hair related error compensations. For another example, compared to hair, human hands are another challenging part for accurate extraction. This is often due to the fast movement of hands. In some embodiments, the image error compensation results in the learning process can especially emphasize in motion-related compensation. The much detailed learning and extraction of special human body part disclosed herein are far superior to the existing one-for-all extraction approaches. As a results, the method and system disclosed herein are much more accurate and much faster in processing to satisfy demand for speed and accuracy in the real-time holographic AR communication.

At step 226, one or more human objects are extracted based on human object extraction parameters that can be from a pre-defined user preference or system setting, such as human objects within certain depth region, human objects located within certain spatial areas, human objects with certain characteristics, certain kinds of human objects, certain human objects, objects with certain relationship to the human object(s) in real-time data, etc.

At step 228, the real-time data are subject to analysis for gesture and body language recognition, including facial expression. At step 228, the original real-time data, the adaptive real-time learning results from step 210, and the image error compensation from 204 can all be accessed. Body language is often related to certain culture background. Here, additional information relating to culture background are needed for interpretation of body language. For example, a person from India shakes her head when in agreement with someone. In some embodiments, recurrent neural networks are used to learn and recognize the gesture and body language. In some embodiments, time and spatial domain feature-point based approaches were used to learn and recognize the gesture and body language. Example feature-point based approaches are SIFT, SURF, HOG (histogram of oriented gradients), etc. In some embodiments, face/body parts extraction results from step 226 were used to improve the gesture and body language learning and recognition.

In some embodiments, the result of the gesture and body language recognition from step 228 was used to further refine the extraction of face/body parts of one or more human objects in step 226.

At step 230, movement and/or projection information is further interpreted from the processed image data such as the gesture and body language recognition information (e.g., obtained at step 226). The movement and/or projection information can be used to define relations between an extracted object and AR input date received, e.g., at step 232). In other words, at step 230, human behavior elements are analyzed to prepare the system to accept the interactive control and feedback from the users. In some embodiments, the interpretation can include matching the gesture, and/or body language (including facial expression) with system recognizable gestures and/or body languages to interpret their meaning. In some embodiments, artificial intelligence approach can be used to gradually learn and understand user behaviors to have intelligent interpretation of the human behaviors. In some embodiments, confirmation is requested from the user by the system after each interpretation to ensure the accuracy of interpretation and/or perform enforcement-based learning.

At step 232, AR input data are received. As disclosed, the AR input data can include a virtual environment, an altered version of the actual environment or scene, a person or object, or any other data that is not part of the data or signals that are being captured in real-time. In cases where the AR input data are unrelated to the data or signals that are being captured, step 232 is independent from other processing steps and can occur before any of steps 202 through 230. Here, the AR input data can be system pre-generated image, video, 3D data, etc. It can also be data sent from another computer/camera.

At step 234, projection input data can be received based a user preference or system setting. In some embodiments, projection parameters can be depth-related, for example, the parameters can provide absolute or related depth-relations between the extracted objects, the human objects, and AR input data. In some embodiments, the extracted objects, the extracted human objects, and AR input data can have their own internal depth information. In some embodiments, the project parameters can include transparency relations, through which transparency parameters are set for the extracted object, the extracted human objects, and the AR input data. In some embodiments, the projection parameters can include positional relation-based approach, where it sets the absolute or related spatial relations along with scales of the extracted objects, the human objects, and AR data. In some embodiments, the projection parameters can include a visual relation-based approach. In some embodiments, the approach sets the absolute or related visual projection relation between the extracted objects, the human objects, and AR data based on different view perspective. In some embodiments, the projection parameters can include human interactive control information from step 234. In some embodiments, the projection parameters can include combination of two or more above parameters.

At step 236, information extracted from real-time data is integrated with the AR input data to generated 2D/3D and still/time series data projection based on the projection parameters. Here the projection is obtained by projecting the input data along with the extracted data into the space based on the preset system criteria, real-time learned movements/ projection information, or interactive control commands from the gesture/body language. For example, a novel 3-layer based pixel-by-pixel projection approach is developed to project the objects to the camera view very fast (see, for example, FIG. 3A). Additional details concerning the combination of extracted data with the AR input data can be found in connection with the description of blocks 18 and 20 of FIG. 1A.

At step 238, integrated or projected data are produced. As disclosed herein, the process illustrated in FIG. 2A occurs in real-time and continuously. It would be understood that outputting step 238 also takes place in real-time and continuously, such that original data captured at step 202 are processed and presented in real-time and continuously.

In some embodiments, the extracted objects and human objects output at step 238 can also be used as input to the next iteration of learning in step 210. In some embodiments, also outputs the background environment can be provided at step 238; for example, by subtracting of the extracted objects and human objects from real-time data and use it as input to the next learning in step 210. In some embodiments, step 238 can output the learned background environment based on accumulative learning continuously as starting material for step 210 of the next iteration of learning. Many different learning methods can be used. In some embodiments, a learning method can be simple weighted-addition of previously learned background environment and newly learned background environment. In some embodiments, deep learning can be applied.

FIG. 2B depicts example steps and system of iterative real-time learning for generating AR-based real-time image data. Exemplary embodiment 240 illustration data learning from when real-time data are first received at step 242 to when object results are output at step 276.

At step 242, real-time data are captured at the beginning of a real-time iterative learning process. The captured data can include but are not limited to audio, visual and sensor data.

In some embodiments, camera error compensation step 244, data processing step 246 and object processing step 248 can collectively form the initial real-time data processing stage 250. For example, during object processing step 248, depth-result can be used to roughly separate the objects into background and foreground. In some embodiments, possible errors in the depth separation can be detected and subsequently corrected, based on known depth characteristics. In some embodiments, an object or scene can be divided into segments and characteristics of the object or scene can be learned separately from the segments based on the color/ intensity characteristics. In some embodiments, an object or scene can be divided into segments and characteristics of the object or scene can be learned separately from the segments based on the difference of infrared light response. In some embodiments, an object or scene can be divided into segments based on the learning results.

As disclosed herein, these steps can take place simultaneously. The results from one particular step can affect the results of one or more other steps.

In some embodiments, these steps can occur in an iterative manner until pre-defined criteria are met. For example, step 250 will be completed once a processing error falls below a threshold value, indicating convergence of processed data. Such data refinement techniques are widely known in the field. Additional details concerning error compensation, data processing and object processing (including e.g., object learning, object recognition, and segmentation) can be found in description in connection with FIGS. 1D and 2A.

At step 252, real-time learning results (used interchangeably with the term "learning results" unless otherwise noted) are produced. In some embodiments, output object results are not created at the initial stage of real-time real-time/ processing until a threshold is met. The threshold can be a time limited. For example, output object results can be generated after data collected over about half second have been subjected to real-time learning. The time limitation can be arbitrarily set by the system or a user, for example, from seconds to minutes or tens of minutes. In practice, the system/method can include an initial calibration step before augmented data are generated and transmitted. In some embodiments, information learned during the initial calibration step can be saved and used to optimize subsequent operations, including, for example, to shorten the calibration step for the next real-time communication session using the methods/system disclosed herein.

At step 258, the system continues to receive data in real-time (e.g., at time point Tn).

At step 260, real-time learning steps (e.g., image error compensation step 262, data processing step 264, and object processing step 266) are applied to the data received at step 258. As disclosed herein, image error compensation step 262, data processing step 264, and object processing step 266 can take place in parallel, and results from one step can affect the outcome of one or more other steps and occur in an iterative manner. Additional details concerning error compensation, data processing and object processing (including e.g., object learning, object recognition, and segmentation) can be found in description in connection with FIGS. 1D and 2A.

At step 254, previously learning results are applied to real-time learning step 260; for example, in any of image error compensation step 262, data processing step 264, and/or object processing step 266.

At step 256, offline learned object data (e.g., data for human identification) can be applied to real-time learning step 260; for example, in any of image error compensation step 262, data processing step 264, and/or object processing step 266. Additionally or alternatively, a predefined user preference or system setting can be applied to real-time learning step 260. In some embodiments, during error compensation 262, possible errors in the depth separation can be detected and subsequently corrected, based on known camera characteristics. During data processing 264, noise reduction is applied. During object processing step 266, depth-result can be used to roughly separate the objects into background and foreground. In some embodiments, during object processing step 266, an object or scene can be divided into segments and characteristics of the object or scene can be learned separately from the segments.

In some embodiments, real-time learning step 260 can occur iteratively. For example, step 260 will be completed once a processing error falls below a threshold value, indicating convergence of processed data. Such data refinement techniques are widely known in the field.

In some embodiments, at real-time learning step 260 the extracted object and human object information is received from the previous time step and used for learning at this step. In some embodiments, at step 260 the background environment information is received from a previous step or time point and used for learning of the background information and object information at the current step.

At step 270, updated learning results are produced. As disclosed herein, the updated learning results are derived from previous learning results (e.g., at time point Tn−1) and offline learned object data (e.g., data for human identification). In some embodiments, learning results are updated by using both the current learning result and previous learning results (e.g., at time point Tn−1). In this way, noise impact to the learning result can be mitigated. At the same time, the system can better adapt to changes.

At step 272, the updated learning results are used to facilitate extraction of object or scene. As disclosed in FIGS. 1D and 2A, any or all of object learning, object recognition, and segmentation can be applied during the extraction. In some embodiments, additional information such as a user preference or system setting can be applied for the extraction of an object or a scene. In some embodiments, depth-based separation results are also used during object processing 272.

At step 274, the system checks if data are being collected at the next time point, if more data are being received, the method returns to step 258 to restart real-time learning and processing.

When no more data are being received, the method ends at step 276. In some embodiments, final object results are produced to conclude the method.

Figure 2C:
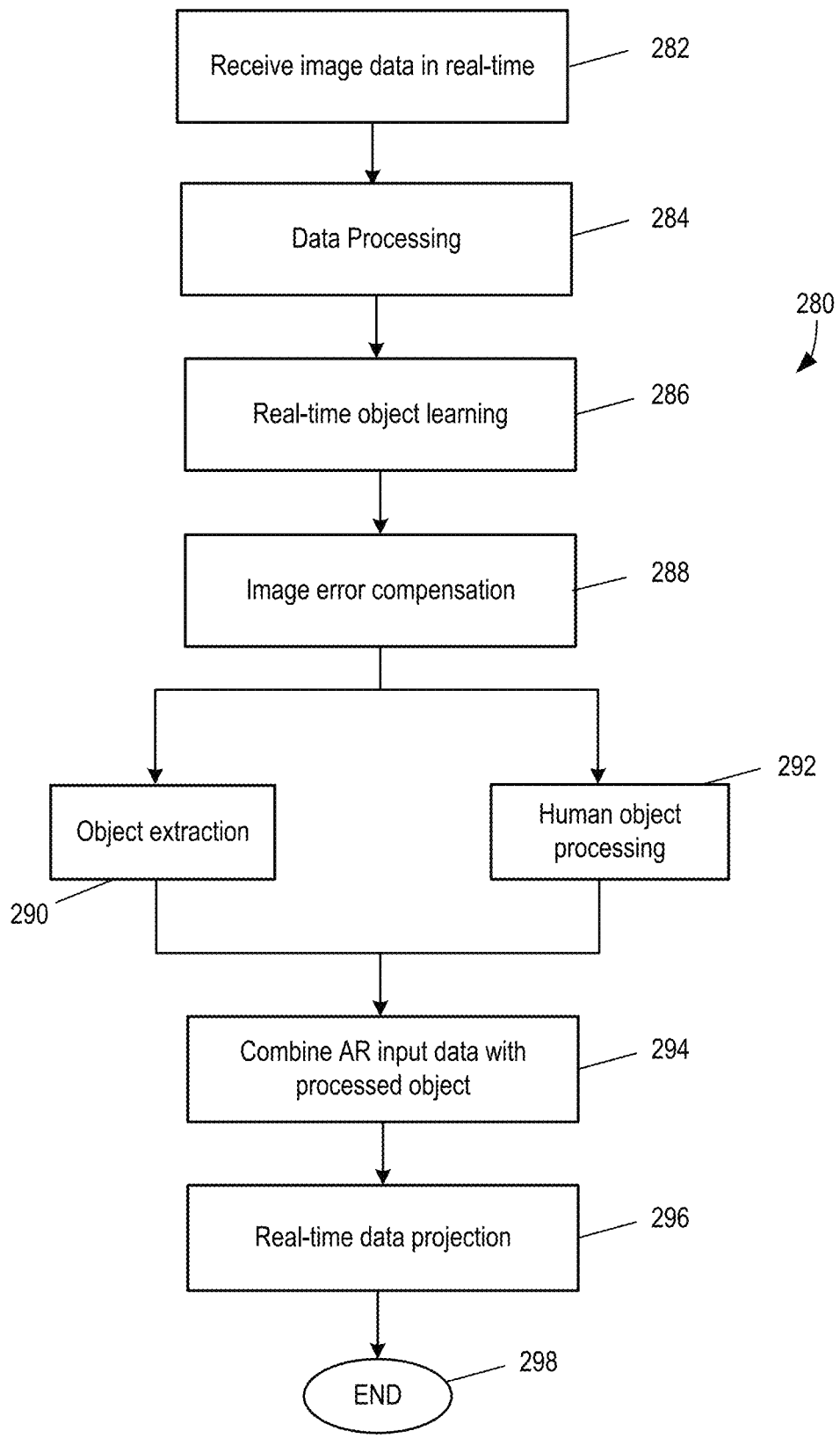
FIG. 2C depicts an overall example process for generating AR-based real-time image data.

FIG. 2C depicts an overall example process for generating AR-based real-time image data. Exemplary embodiment 280 outlines key steps 282 through 298, most of which have been described in detail in connection with FIGS. 1D, 2A, and 2B.

At step 282, image data are received in real-time.

At step 284, the real-time image date are processed to improve data quality, for example, via noise reduction.

At step 286, real-time object learning is carried out; for example, through object learning, object recognition, and segmentation.

At step 288, both hardware and software adjustment such as camera and image error compensation can be performed based on the results from steps 284 and 286. In some embodiments, error compensation can be performed for software component as well. For example, depending on the initial learning results, the system may increase or decrease the duration of the calibration step (e.g., step 252 in FIG. 2B), depending on the calibration outcome.

At step 290, an object or a scene is extracted from the processed data based on real-time learning results and additional information (e.g., previous learning results, offline data, user preferences or system settings). In some embodiments, depth-related information in the image data can be used to roughly separate an object from its background.

At step 292, the extracted object or scene is subject to further processing; for example, such as those disclosed in steps 226 through 230 in FIG. 2A. Additional details can be found, for example, in description in connection with object processing module 134 in FIG. 1D.

At step 294, processed object or scene is combined with AR related input data. As disclosed herein the AR input data can be related or unrelated with real-time image data. Combination or integration of these two types of data, along with other additional data such as additional audio or text data for translation or advertisement related data), can be performed as disclosed in connection with FIG. 2A. A multi-layered and pixel-by-pixel integration process is described in detail in connection with FIG. 3A. For example, depth-related information in the image data can be used to roughly separate an object into multiple layers: partly into the background and partly into the foreground.

At step 296, real-time data projection/integration is carried out. In some embodiments, the projected data are transferred in real-time to another device (e.g., a user device or a server).

At step 298, when the system stops receiving real-time image data, the process is terminated.

Data Integration/Projection

In some embodiments, integration of extracted object/scene with AR input data takes place in a pixel-by-pixel fashion. In some ways, the integration process can be best understood in a reversed manner starting from the integrated image. In some embodiments, each pixel within an integrated image can be divided into multiple layers such as a foreground layer, an intermediate layer and a background layer. Each layer is filled based on image information from respective corresponding pixels the extracted real life object and/or virtual environment.

Figure 3A:
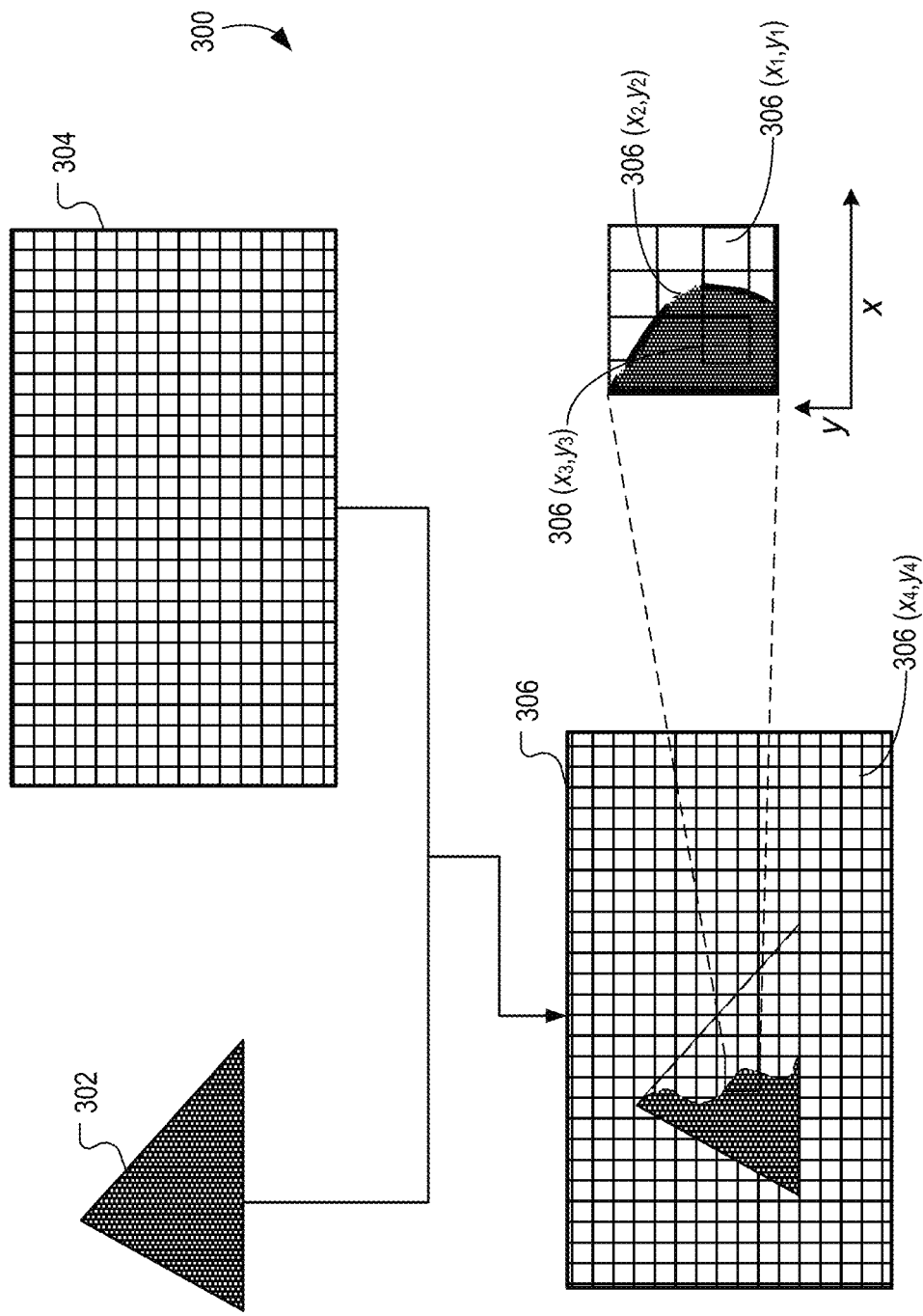
FIG. 3A depicts example information flow during integration of extracted data with AR input data for generating AR-based real-time image data.

FIG. 3A depicts example information flow during integration of extracted data with AR input data for generating AR-based real-time image data. In particular, exemplary embodiment 300 shows how the AR-based image data is generated via pixel-by-pixel integration. Here a simplified extracted real life object 302 is represented by a triangle. A simplified version of AR input data (e.g., a virtual environment) is shown as 304, a rectangle with grid patterned, where each grid represents a pixel. An image obtained by integrating real life object 302 with AR input data 304 (e.g., a virtual environment) is illustrated as integrated image 306. As depicted, certain pixels of real life object 302 become invisible (being positioned behind AR input data 304); see, for example, pixel 306 ($x_1$, $y_1$). Some pixels of real life object 302 are partially visible and partially invisible (being positioned partially in front of and partially behind AR input data 304); see, for example, pixel 306 ($x_2$, $y_2$). Some pixels of real life object 302 are completely visible (being positioned in front of AR input data 304); see, for example, pixel 306 ($x_3$, $y_3$). Some of the pixels in integrated image 306 complete lack any information from real life object 302; see, for example, pixel 306 ($x_4$, $y_4$).

Using the three layered approach, pixel 306 ($x_1$, $y_1$) has a front layer that is defined by a pixel in AR input data 304

(e.g., a virtual environment) and either its intermediate layer or background layer can be filled with information from a corresponding pixel from real life object 302. However, because the transparency value of the front layer is set at 0, whatever behind the front layer is completely blocked by the pixel in AR input data 304 (e.g., a virtual environment). As such, alternatively, pixel 306 ($x_1$, $y_1$) can be obtained by defining its front layer with the pixel information from AR input data 304 (e.g., a virtual environment) while setting values of the intermediate layer or background layer to null.

Pixel 306 ($x_2$, $y_2$) depicts information from both real life object 302 and AR input data 304 (e.g., a virtual environment). This pixel can be obtained by defining the front layer with partial information from real life object 302, the intermediate layer with information from a corresponding pixel from AR input data 304 (e.g., a virtual environment), and the background layer with partial information from real life object 302. Again, the transparency level for each layer is set at 0 so the intermediate layer is partially shown and the background layer is completely blocked. When the transparency levels for different layers are set at none-zero value, information from real life object 302 and AR input data 304 (e.g., a virtual environment) will blend with each other throughout the pixel.

Pixel 306 ($x_3$, $y_3$) is the opposite of pixel 306 ($x_1$, $y_1$). It has a front layer that is defined by a pixel in real life object 302 and either its intermediate layer or background layer can be filled with information from a corresponding pixel from virtual environment 304. However, because the transparency value of the front layer is set at 0, whatever behind the front layer is completely blocked by the pixel in real life object 302. As such, alternatively, pixel 306 ($x_3$, $y_3$) can be obtained by defining its front layer with the pixel information from real life object 302 while setting values of the intermediate layer or background layer to null.

Pixel 306 ($x_4$, $y_4$) is located in an area where real life object 302 and AR input data 304 (e.g., a virtual environment) do not overlap. In this case, real life object 302 is completely missing. It can be obtained by defining any of the three layers with the information from the corresponding pixel from virtual environment 304 while setting the value for the remaining levels to null.

In some embodiments, as illustrated above, parallel computing can be carried out for multiple pixels at the same time. In some embodiments, computing can be simplified by identifying pixels in non-overlapping regions. In some embodiments, computing can also be simplified by defining only the top layer for solid pixels that are completely non-transparent.

In some embodiments, the extracted real life object comprises three-dimensional image information that can be divided between one or more of the front, intermediate and background layers in any combinations. In some embodiments, the virtual environment comprises three-dimensional image information that can be divided between one or more of the front, intermediate and background layers in any combinations.

In some embodiments, the relations between an extracted real life object (e.g., 302) and AR input data (e.g., 304 a virtual environment) changes dynamically. In some embodiments, such dynamic changes take place over time between integrated images. For example, real life object 302 may move in and out of AR input data 304 (e.g., a virtual environment). In some embodiments, at least a portion of the real life object interacts with one or more elements of the virtual environment. For example, this can occur in a game setting where a real life object (a user) can use gesture to bounce balls off a wall in the virtual environment or pass a ball to a player in the virtual environment.

It is to be noted that functionalities associated with the blocks in FIGS. 1A through 1D can take place on the same computer device, on different computer devices, or on a cluster of servers. When the functionalities are performed by different computer devices, any combinations of devices can be used. When the functionalities are performed by a cluster of servers, any servers can be used (single server, a group of servers at a same location, or a group of servers at different locations). It should be noted that, in any of the combinations, image capture is always performed by the computer device that is accessible to the user or real life object.

Figure 3B:
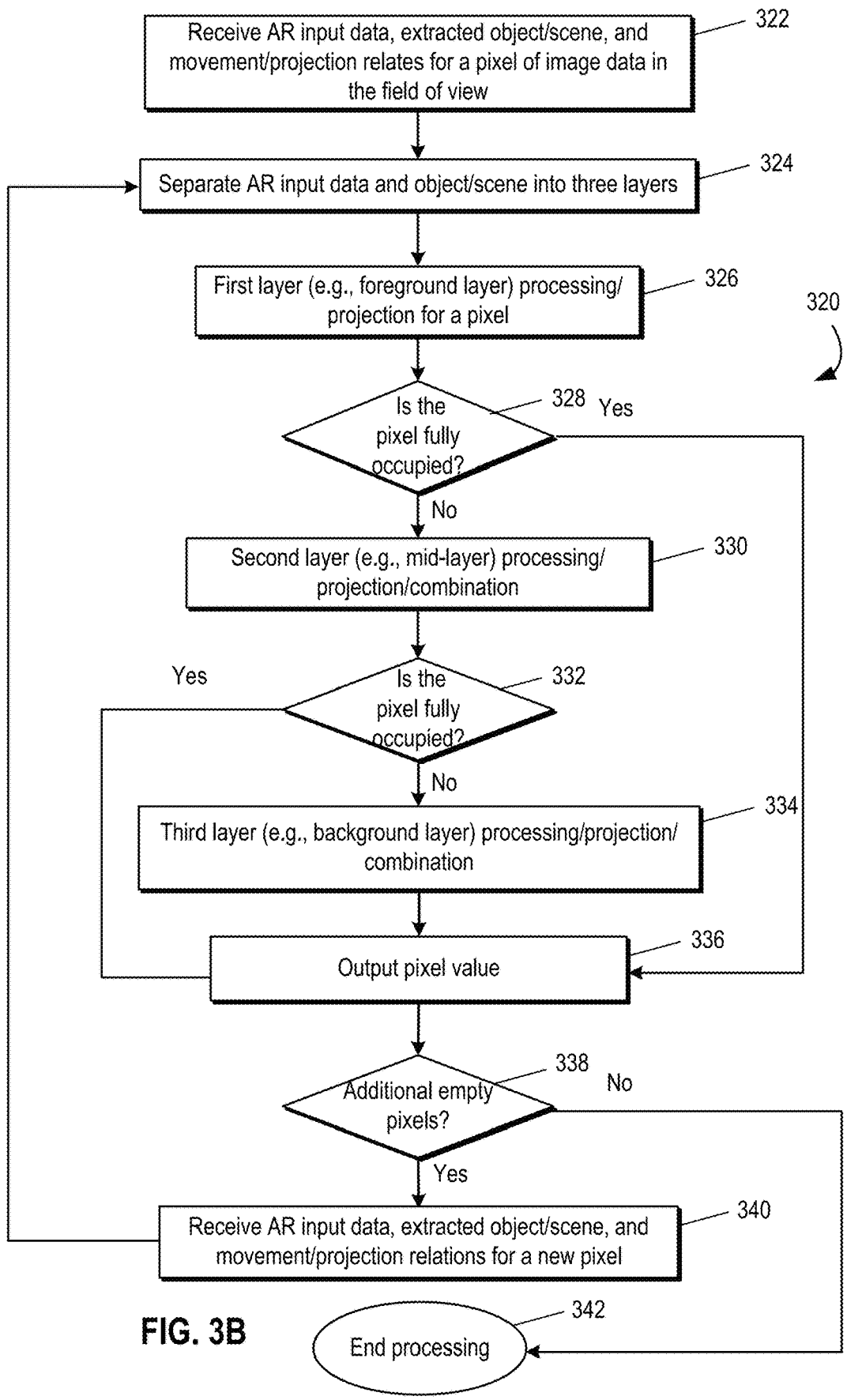
FIG. 3B depicts example steps for generating AR-based real-time image data from extracted data and AR input data.

FIG. 3B depicts example steps for generating AR-based real-time image data from extracted data and AR input data. Exemplary embodiment 320 shows how extracted object or scene data and the AR input date are separated into multiple layers (e.g., 3 layers) and integrated/projected via a pixel-by-pixel process. The functionalities described herein can be performed by, for example, the object processing module 134.

At step 322, the AR input data and extracted object/scene for a field of view are received. Also received are movement/projection relations (e.g., as described in connection with FIG. 2A) that define the relations for corresponding pixels in the extracted object/scene and the AR input data.

At step 324, the AR input data and extracted object/scene are separated into three layers. In some embodiments, the separation takes place in a pixel-by-pixel process. In some embodiments, the separation takes place by groups of pixels. For example, in a certain group of pixels, the AR input data are mostly separated into the foreground layer. In another group of pixels, the extracted object/scene can be separated into the foreground layer.

At step 326, integration/projection begins with the first layer (e.g., the foreground layer for a pixel. For example, the AR input data and extracted object/scene for the particular pixel are allocated based on the integration relations to fill the pixel. In some embodiments, the total occupancy in a pixel is defined as 1. In some embodiments, occupancy is defined as opacity.

At step 328, the system examines whether the particular pixel is fully occupied. If it is, the method skips ahead to step 336 and produce a complete pixel output. In some embodiments, if the pixel from foreground or foreground combination has opacity of 1 (i.e., alpha=1), the pixel will be considered fully occupied. The processing would skip to step 336. If the pixel is not fully occupied (or having occupancy level smaller than 1), the process moves to step 330, which performs integration/projection for the second layer (e.g., the mid-layer).

At step 330, first layer (or foreground) data are combined with second layer (or mid-layer) data.

At step 332, the system examines whether the particular pixel is fully occupied. If it is, the method skips ahead to step 336 and produce a complete pixel output. In some embodiments, the pixel from foreground and mid-layer combination has occupancy or opacity of 1 (i.e., alpha=1), the pixel is fully occupied. The processing would skip to step 336.

If the pixel is not fully occupied (or having occupancy level smaller than 1), the process moves to step 334, which performs integration/projection for the third layer (e.g., the background layer). By default, a pixel would be complete after three-layers of integration. At step 336, a complete pixel is produced.

As step 338, the system determines if there are additional pixels remaining empty or incomplete in the particular field of view. If there are, the method continues at step 340 to receive AR input data, extracted object/scene, and movement/projection relations for a new pixel, and goes back to step 324 to restart the integration process.

If there are no empty pixels left, the process ends at step 342.

Figure 3C:
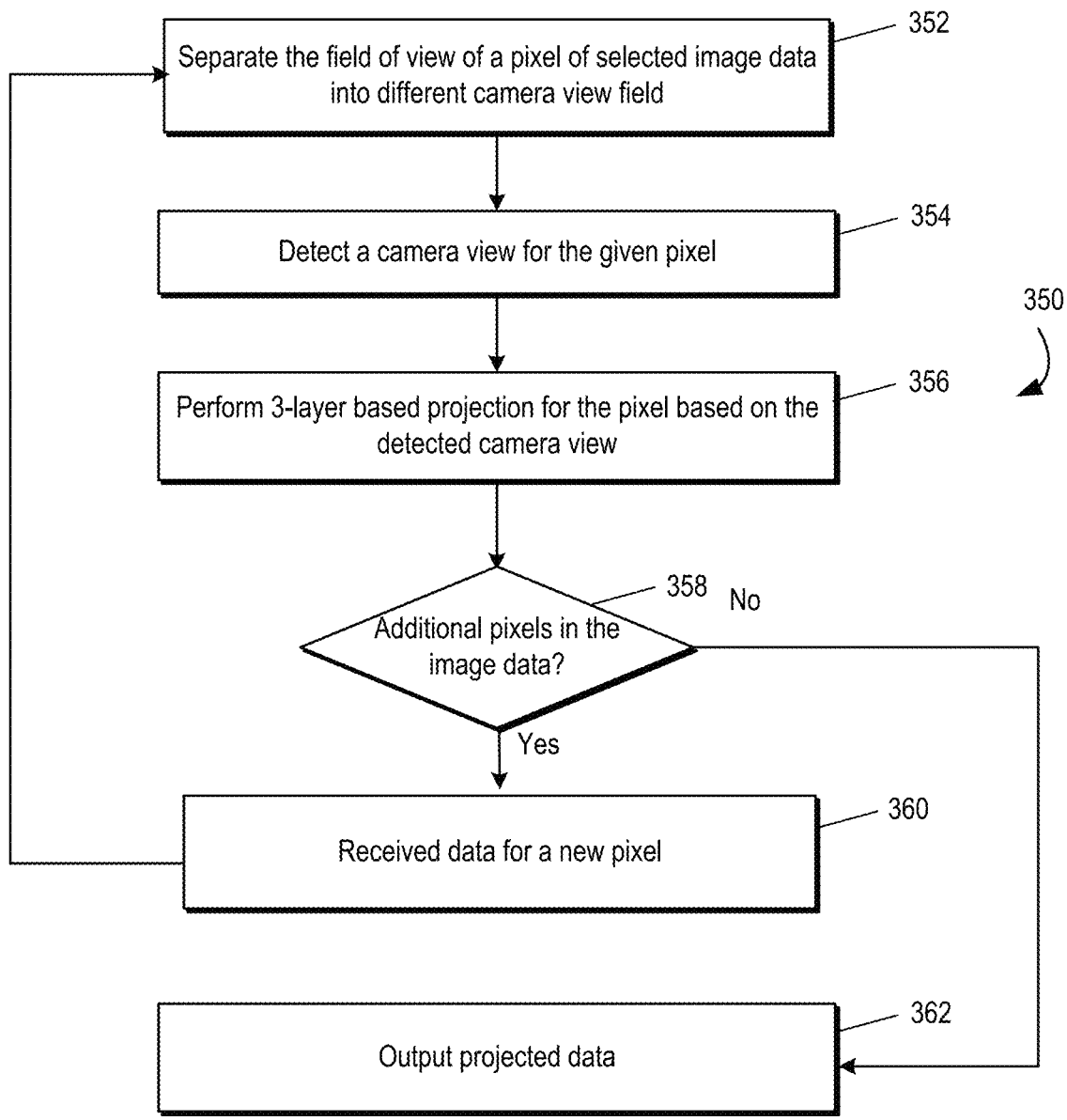
FIG. 3C depicts example steps for generating AR-based real-time image data from extracted data and AR input data.

FIG. 3C depicts example steps for generating AR-based real-time image data from extracted data and AR input data. Here, exemplary embodiment 350 shows how camera view can be implemented for each pixel.

At step 352, for each pixel in the field of view, the field of view the pixel is separated into different camera view field based on, for example, real-time learning results, user preferences, or system settings.

At step 354, the camera view associated with a given pixel is detected and a proper view is assigned to the pixel. Again, the assignment can be based on, for example, real-time learning results, user preferences, or system settings.

At step 356, a multi-layer based real-time projection approach (e.g., FIG. 3B) is applied to generated an integrated pixel with a particular camera view.

At step 358, the system determines if there are additional pixels in the image data. If there are no additional pixels, the method skips to step 362. If there are, the process proceeds to step 360.

At step 360, data for a new pixel are received and the method returns to steps of 352 and repeat steps 352 through 358 for the new pixel.

At step 362, completely projected data for the particular field of view are produced.

Note, even though FIG. 3A provides a 2D view of the output image for the convenience of drawing, the description of the projection can be applicable to both 2D and 3D output. In general, a display can be separated into 2D display and 3D display. Here the 2D display can include a flat screen display, a curved screen display, or a cubic display. Some 2D screen display can show 3D effects through 3D glasses, or for naked eye. However, these are still called 2D displays in this patent application because viewers are seeing same view perspectives (2D or 3D view). Existing generation of view generation methods commonly performs 3D manipulation, then perform 3D to 2D projection at the display generation step. For the 2D screen 3D view, they just added disparity between left eye and right eye to create synthetic two slightly different 2D views for human brain to construct the 2D. However, this is very ineffective. As disclosed herein when the AR data are processed, they are directly projected based on the view perspective; and as a result, no additional 3D to 2D mapping is necessary. And the 3D manipulation process is greatly simplified. In this way, the current approach greatly simplified the processing and make it work much faster.

When the display is a truly 3D display, e.g., the display can show a cube of pixels and viewers from different angel can see different view perspective simultaneously, the existing generation systems and methods using 3D manipulation and then 2D projection approach would no longer work in this situation because exiting processing methods could not provide pixel level resolution suitable for true 3D cube displays. The output disclosed herein can include a 3D pixel cube. The process will be similar as shown in FIG. 3A. Instead of processing pixel in 2D arrays, our system can process the pixel in 3D arrays. In this way, the current approach can support 3D cube-like displays.

The systems and methods disclosed herein have many applications. For example, they can be used to create or modify images for presentation purposes; see for example, FIG. 4A. Alternatively, they can be used to enable more effective real-time communication, as illustrated in FIGS. 4B through 5C.

As illustrated above in the exemplary embodiment in FIG. 3A, information flow can be divided into three blocks: extracted real life object 302, AR input data 304 (e.g., a virtual environment), and integrated image 306. Functionalities associated with these different information blocks can be performed by one or more computer devices in any combinations (e.g., data processed at one device can be transferred to another device for further or additional processing). Note, here a device can be a user device, a server, or a cluster of servers.

FIG. 4A illustrates a sample process 400 where all functionalities are performed on a user device. After receiving input from a user at step 402, data is captured at step 404 and processed at step 406. Real-time learning takes place at step 408 and error compensation at step 410. Based on the results of error compensation, additional data can be captured under different setting. After receiving AR input data at step 416, data projection takes place at step 418 and projected data are displayed at step 420.

Here, optional offline learned characteristics can be applied to any one or more of steps 406 through 418.

Figure 4B:
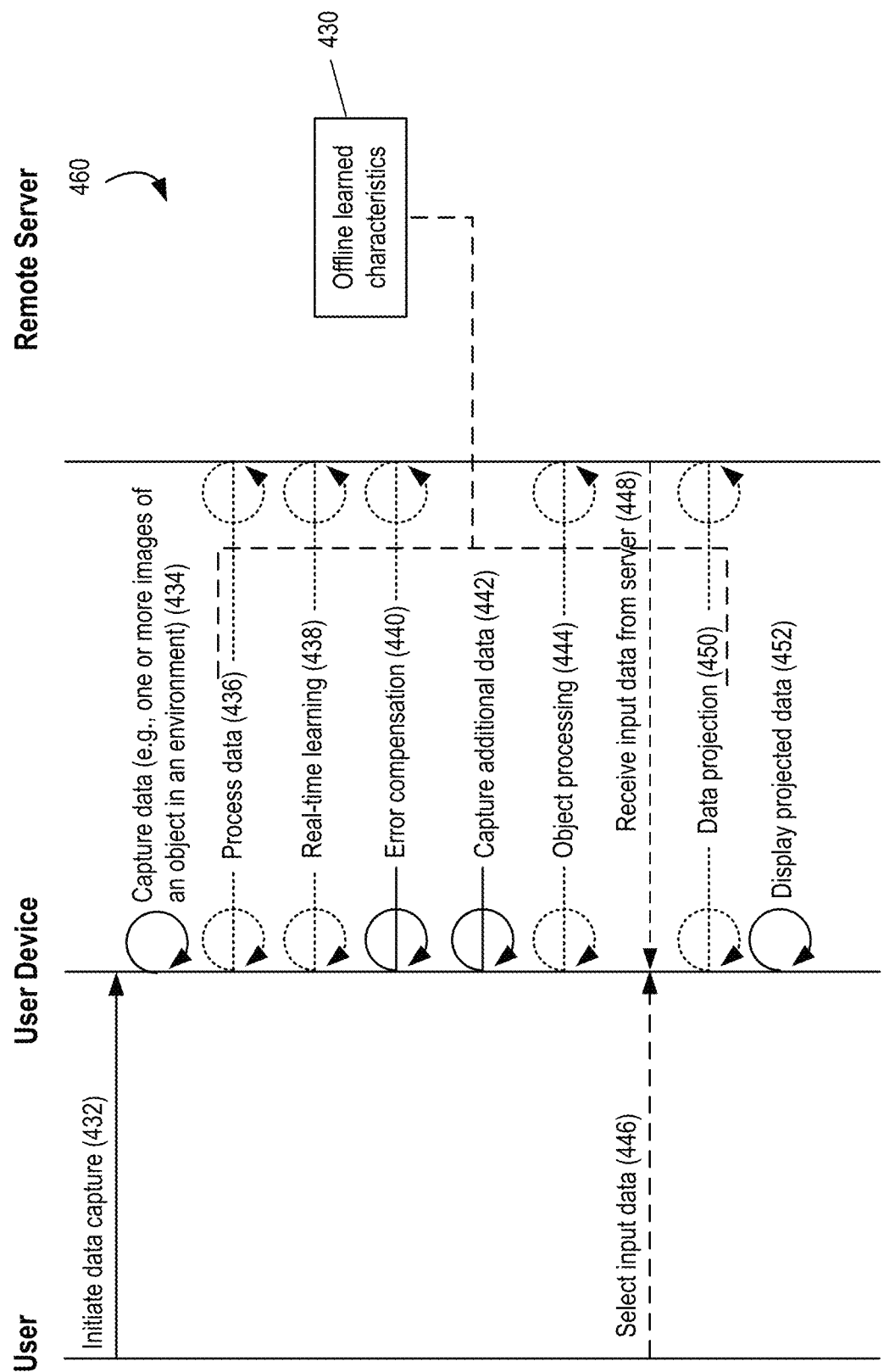
FIG. 4B depicts example interactions between a user and a user device for generating AR-based real-time image data

FIG. 4B depicts a sample process 460 where functionalities are split between a user device and a server. After receiving input from a user at step 432, data is captured at step 434. All the analytic and processing steps (e.g., processing step 436, real-time learning step 438, error compensation step 440, object processing step 444, data projection step 450) can take place on a user device and a server in any combination, with the option to apply option offline learned characteristics can be applied to any one or more of these steps. In some embodiments, a server can mean a cluster of servers, which are located at a same location, or multiple locations.

While additional data are still captured at 442 on the user device, AR input data can be received from either the user device or the server (e.g., steps 446 and 448).

Final display of the projected data will take place on the user device at step 452.

Details concerning each of the method steps can be found in descriptions in connection with FIGS. 1D, 2A-2C, and 3A-3C.

Figure 5A:
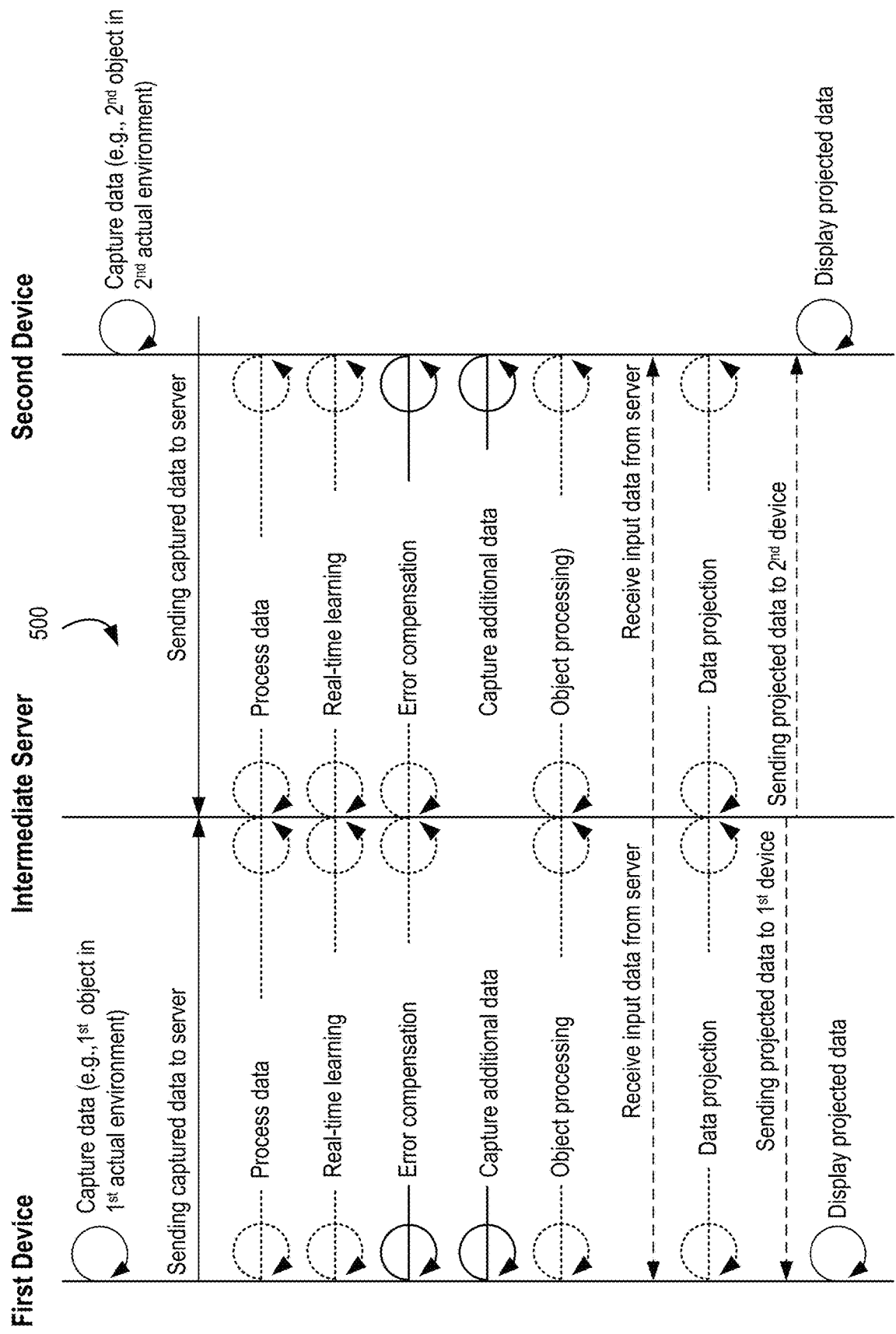
FIG. 5A depicts example interactions between a server and two user devices for generating AR-based real-time image data.
Figure 5B:
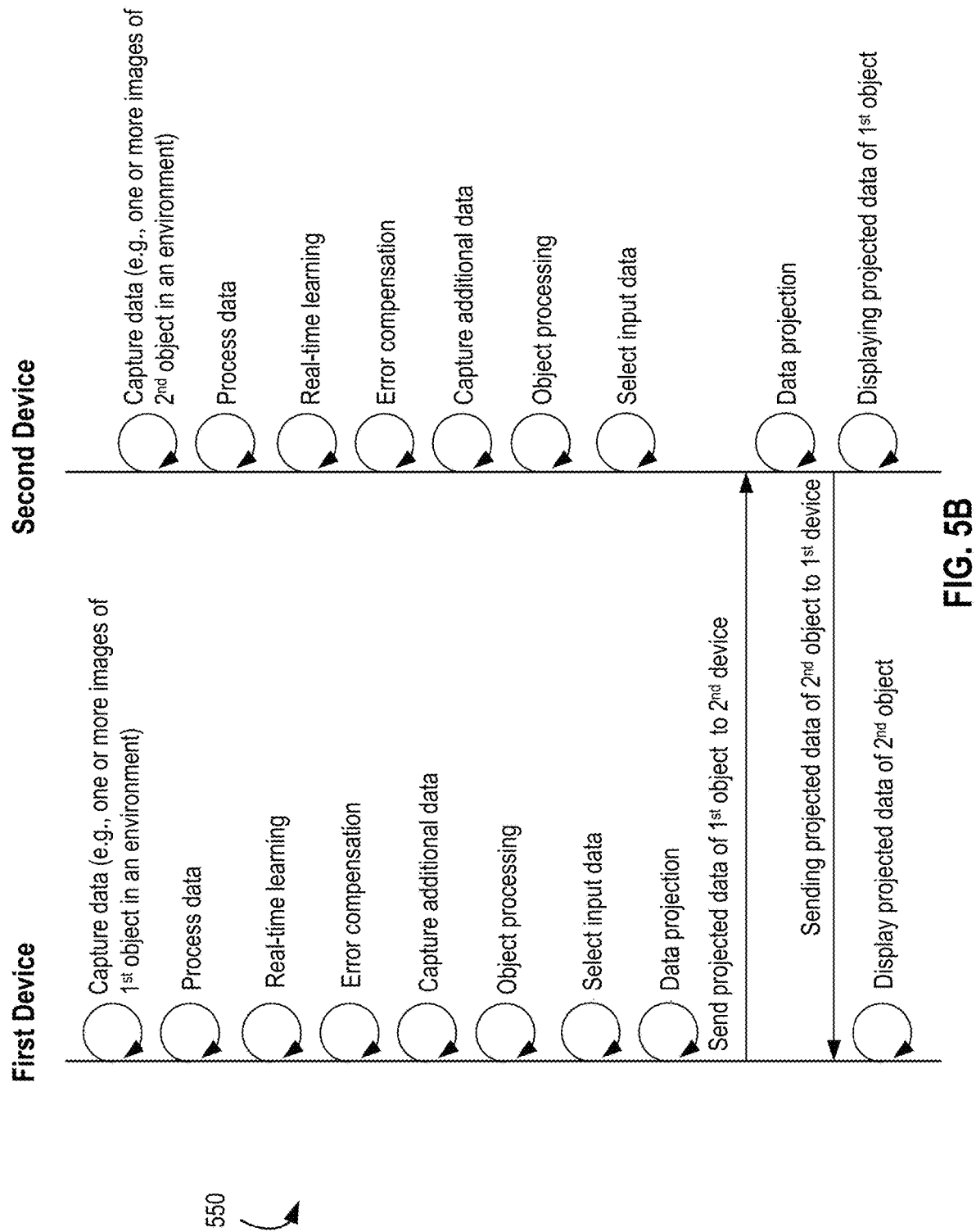
FIG. 5B depicts example interactions between two user devices for generating AR-based real-time image data.
Figure 5C:
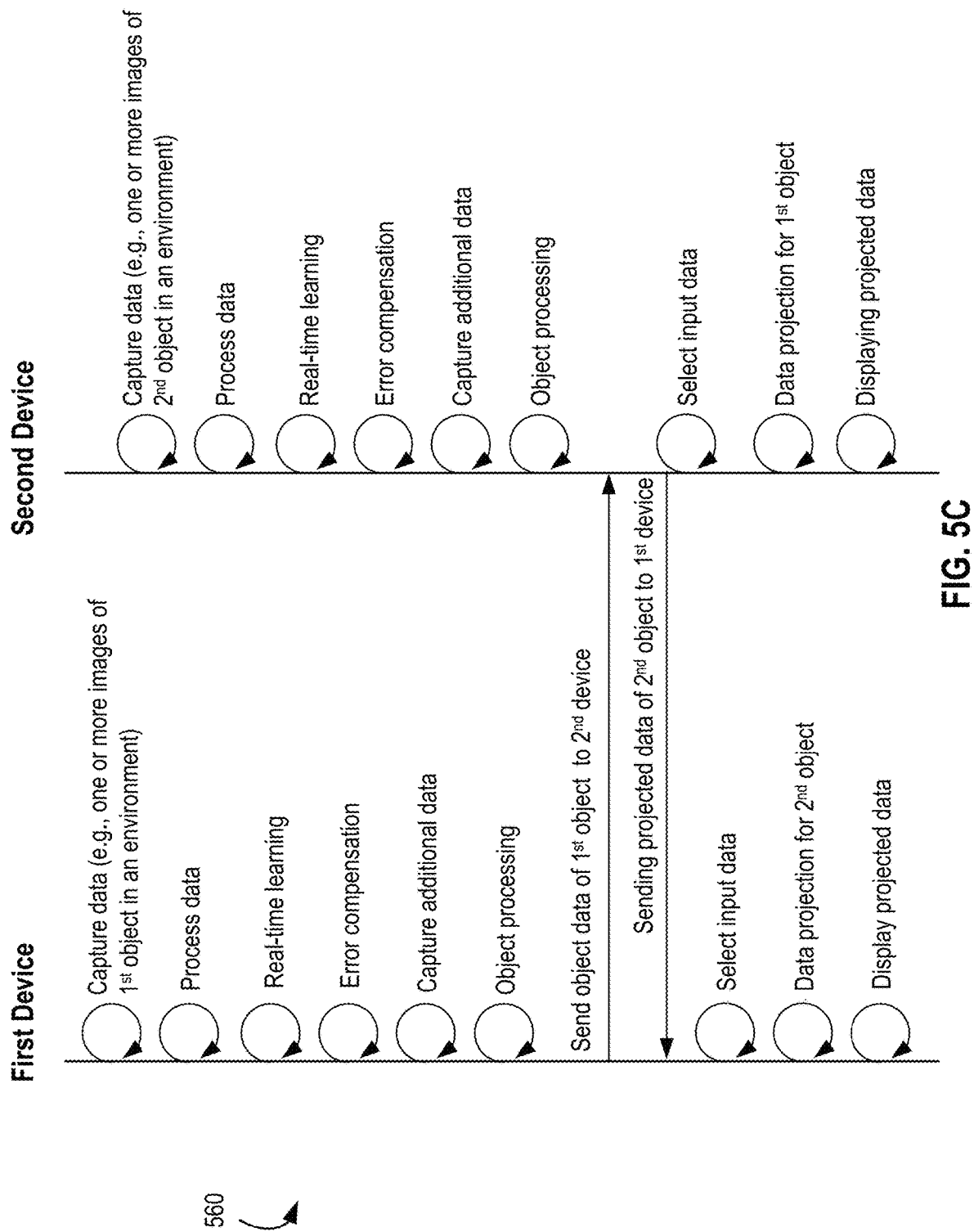
FIG. 5C depicts example interactions between two user devices for generating AR-based real-time image data.

FIGS. 5A through 5C illustrate exemplary embodiments where two user devices communicate with each other, via an intermediate server or directly. In some embodiments, a intermediate server can be a single server, or cluster of servers. In some embodiments, a cluster of servers can be located at a same location. In some embodiments, a cluster of servers can be in multiple locations.

FIG. 5A depicts interactions between two user devices and the intermediate server in a communication process 500.

The functionality split in FIG. 5A is similar to those of FIG. 4B. A few steps (e.g., capture of data, capture of additional data, and display of projected data) take place on the user device, while all the analytic and processing steps (e.g., data processing, real-time learning, error compensation, object processing, data projection) can be divided between a user device and a server in any combination, with the option to apply option offline learned characteristics can be applied to any one or more of these steps.

In a real-time communication according to FIG. 5A, integration data of a first object of a first user device will be communicated to the second device via the intermediate server. In some embodiments, the data can then be displayed by itself where the second user would observe the first user on the second device. In some embodiments, the data can then be combined with data for the second user and displayed where the second user would observe the first user and the second user on the second device.

FIGS. 5B and 5C illustrate how two user device can communicate directly with each other without an intermediate server.

Exemplary embodiment 550 of 5B with respect to either the first device or the second device is similar to exemplary embodiment 400 as depicted in FIG. 4A. In particular, all the analytic and processing steps (e.g., data processing, real-time learning, error compensation, object processing, and data projection) can take place independently on the first device or the second device until projected data are generated. Again, optional offline learned characteristics can be applied to any one or more of the analytical/processing steps.

As disclosed herein, integration data of a first object of a first user device will be communicated to the second device directly or via network connection (though the intermediate network servers are omitted because they do not participate in the analytical and processing of data). In some embodiments, the data can then be displayed by itself where the second user would observe the first user on the second device. In some embodiments, the data can then be combined with data for the second user and displayed where the second user would observe the first user and the second user on the second device. Similarly, integration data of the second object of the second user device will be communicated to and displayed on the first device, either by itself or in combination with data of the first object.

Exemplary embodiment 560 of FIG. 5C is similar to exemplary embodiment 550 of FIG. 5B. As disclosed herein, fewer the analytic and processing steps (e.g., data processing, real-time learning, error compensation, and object processing) can take place independently on the first device or the second device until projected data are generated. As disclosed herein, object data of a first object of a first user device, instead of the integrated data, will be communicated to the second device directly or via network connection (though the intermediate network servers are omitted because they do not participate in the analytical and processing of data). Integration will take place on the receiver device.

During integration, the user of the receiver device has the option to incorporate the received data with data from the receiver device. As an end result, a user of the receiver device can choose to observe the user/object of the first device, either by itself or in combination with user at the receiver device.

Again, details concerning each of the method steps can be found in descriptions in connection with FIGS. 1D, 2A-2C, and 3A-3C.

Example System Architecture

Figure 6:
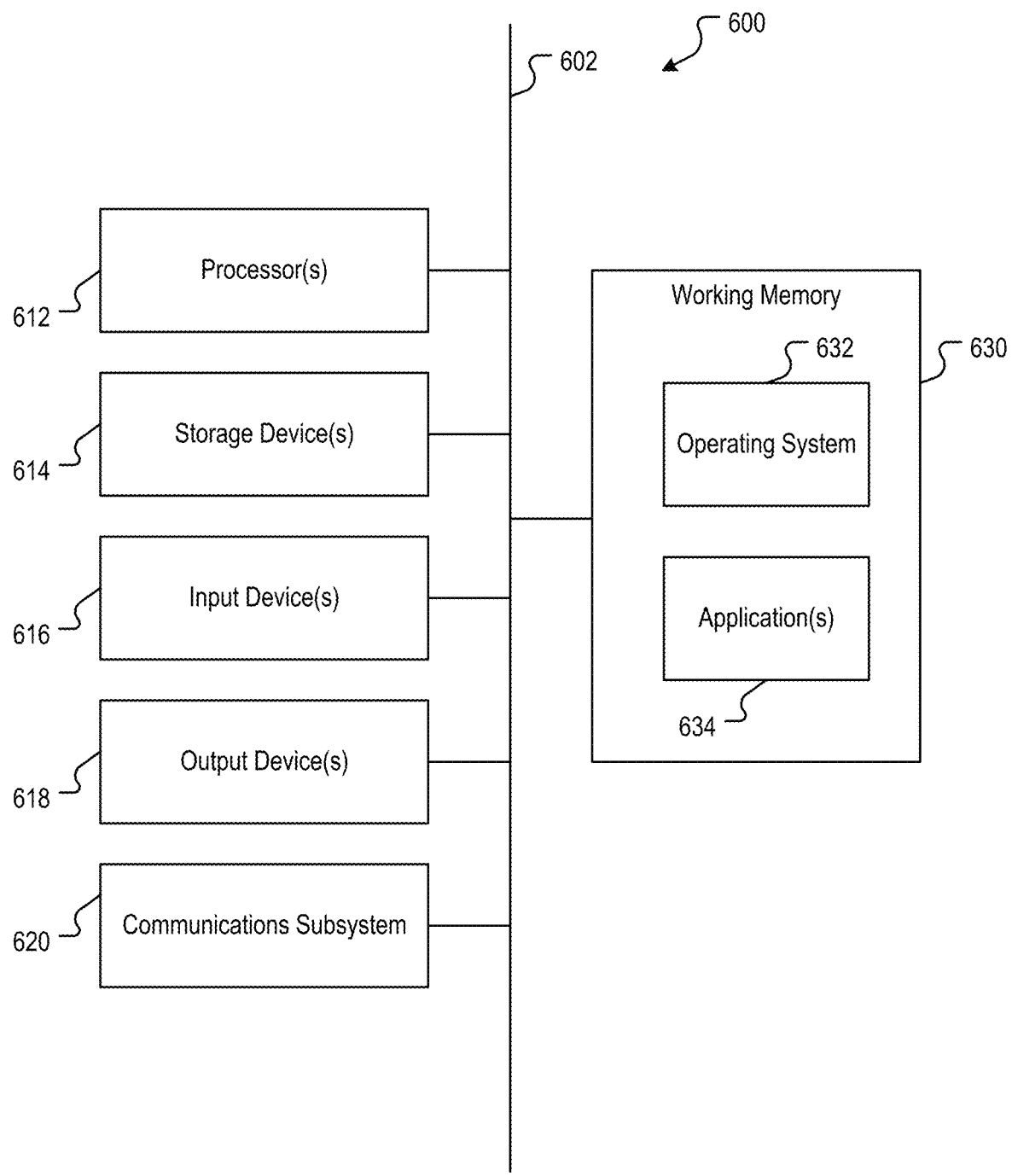
FIG. 6 depicts a diagram of an example system architecture for implementing the features and processes of FIGS. 1-5.

FIG. 6 depicts a diagram of an example system architecture for implementing the features and processes of FIGS. 1-5.

In one aspect, some embodiments can employ a computer system (such as the computer system 600) to perform methods in accordance with various embodiments of the invention. An exemplary embodiment of computer system 600, includes a bus 602, one or more processors 612, one or more storage devices 614, at least an input device 616, at least an output device 618, a communication subsystem 620, working memory 630 which includes an operating system 632, device drivers, executable libraries, and/or other code, such as one or more application(s) 634.

According to a set of embodiments, some or all of the procedures of such methods are performed by the computer system 600 in response to processor 612 executing one or more sequences of one or more instructions (which might be incorporated into operating system 632 and/or other code, such as an application program 634) contained in working memory 630. Such instructions can be read into the working memory 630 from another computer-readable medium, such as one or more of storage device(s) 614. Merely by way of example, execution of the sequences of instructions contained in working memory 630 might cause processor(s) 612 to perform one or more procedures of the methods described herein. Additionally or alternatively, portions of the methods described herein can be executed through specialized hardware. Merely by way of example, a portion of one or more procedures described with respect to the method(s) discussed above, such as method 200, method 240, method 280, and methods illustrated in FIGS. 3-5, might be implemented by processor 612. In some instances, processor 612 can be an example of real-time learning module 130 of user device 120. In some examples, application program 634 can be an example of an application performing the iterative real-time learning method depicted in FIG. 2B. In some embodiments, devices are a cluster of servers. In some embodiments, a cluster of servers can be located at a same location. In some embodiments, a cluster of servers can be in multiple locations.

In some embodiments, computer system 600 can further include (and/or be in communication with) one or more non-transitory storage devices 614, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices can be configured to implement any appropriate data stores, including without limitation, various file systems, database structures, and/or the like. In some embodiments, the storage device 614 can be example of local database 124 of user device 120, local database 144 of user device 140, or the server database 174 of server 170.

In some embodiments, computer system 600 can further include one or more input devices 616, which can comprise, without limitation, any input device that allows a computer device (e.g., user device 120 or 140) to receive information from a user, from another computer device, from the environment of the computer device, or from a functional component communicably connected with the computer device. Examples of input devices include but are not limited to a camera, a microphone, or a sensor.

In some embodiments, computer system 600 can further include one or more input output devices 618, which can comprise, without limitation, any output device that can receive information from a computer device (e.g., user device 120 or 140) and communicate such information to a user, to another computer device, to the environment of the computer device, or to a functional component communicably connected with the computer device. Examples of input devices include but are not limited to a display, a speaker, a printer, a light, a sensor device, and etc. A sensor device can receive and exhibit data in forms that can result in sensory perception by a user. Such forms include but are not limited to heat, light, touch, pressure, motion, and etc.

It would be understood that any applicable input/output devices or components, such as those disclosed in connection with user device 120, user device 140, or server 170, can be applied to input device 616 and output device 618.

In some embodiments, computer system 600 might also include a communications subsystem 620, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. Communications subsystem 620 can include one or more input and/or output communication interfaces to permit data to be exchanged with a network, other computer systems, and/or any other electrical devices/peripherals. In many embodiments, computer system 600 will further comprise a working memory 630, which can include a RAM or ROM device, as described above.

In some embodiments, computer system 600 also can comprise software elements, shown as being currently located within the working memory 630, including an operating system 632, device drivers, executable libraries, and/or other code, such as one or more application(s) 634, which can comprise computer programs provided by various embodiments, and/or can be designed to implement methods, and/or configure systems, provided by other embodiments, as described herein. Merely by way of example, a portion of one or more procedures described with respect to the method(s) discussed above, such as the methods described in relation to FIGS. 2-5, can be implemented as code and/or instructions executable by a computer (and/or a processing unit within a computer); in an aspect, then, such code and/or instructions can be used to configure. and/or adapt a general purpose computer (or other device) to perform one or more operations in accordance with the described methods. In some instances, working memory can 630 can be an example of the memory of user device 120 or 140.

A set of these instructions and/or code might be stored on a non-transitory computer-readable storage medium, such as storage device(s) 614 described above. In some cases, the storage medium might be incorporated within a computer system, such as computer system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by computer system 600 and/or might take the form of source and/or installable code, which, upon compilation and/or installation on the computer system 600 (e.g., using any of a variety of generally available compilers, installation programs, compression/decompression utilities, etc.), then takes the form of executable code. In some instances, storage device(s) 630 can be an example of the memory of user device 120 or 140.

It will be apparent to those skilled in the art that substantial variations can be made in accordance with specific requirements. For example, customized hardware might also be used, and/or particular elements might be implemented in hardware, software (including portable software, such as applets, etc.), or both. Further, connection to other computing devices such as network input/output devices can be employed.

The terms "machine-readable medium" and "computer-readable medium," as used herein, refer to any medium that participates in providing data that causes a machine to operate in a specific fashion. In an embodiment implemented using computer system 600, various computer-readable media might be involved in providing instructions/code to processor(s) 612 for execution and/or might be used to store and/or carry such instructions/code. In many implementations, a computer-readable medium is a physical and/or tangible storage medium. Such a medium can take the form of a non-volatile media or volatile media. Non-volatile media include, for example, optical and/or magnetic disks, such as storage device(s) 614. Volatile media include, without limitation, dynamic memory, such as working memory 630.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, or any other medium from which a computer can read instructions and/or code.

Various forms of computer-readable media can be involved in carrying one or more sequences of one or more instructions to processor(s) 612 for execution. Merely by way of example, the instructions can initially be carried on a magnetic disk and/or optical disc of a remote computer. A remote computer might load the instructions into its dynamic memory and send the instructions as signals over a transmission medium to be received and/or executed by computer system 600.

Communications subsystem 620 (and/or components thereof) generally will receive signals, and bus 602 then might carry the signals (and/or the data, instructions, etc. carried by the signals) to working memory 630, from which processor(s) 612 retrieves and executes the instructions. The instructions received by working memory 630 can optionally be stored on non-transitory storage device 614 either before or after execution by processor(s) 612.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

I claim:

1. A real-time holographic augmented reality image processing method, comprising:
   receiving, at a cluster of servers, real-time image data from an image capturing component;
   extracting one or more objects or a scene from the real-time image data based on results from real-time adaptive learning and one or more object/scene extraction parameters, wherein the real-time adaptive learning comprises object learning, object recognition, object segmentation, scene learning, scene recognition, scene segmentation, or a combination thereof;
   extracting one or more human objects from the real-time image data based on results from real-time adaptive human learning and one or more human extraction parameters, wherein the real-time adaptive human learning comprises human characteristic learning, human recognition, human segmentation, human body movement tracking, or a combination thereof;
   receiving augmented reality (AR) input data; and
   creating holographic AR image data by projecting, for each image, the extracted object or scene, the extracted human object, and the AR input data using a multi-layered mechanism based on projection parameters.

2. The real-time image processing method of claim 1, wherein the cluster of servers comprises a single server, a group of servers located a same location, or multiple group of servers located in multiple physical locations.

3. The real-time image processing method of claim 1, wherein the method further comprise:
   continuing to receive additional images constituting the real-time image data while applying real-time error compensation to the image capture component based on the real-time adaptive learning of the image data; and
   performing the real-time adaptive learning of the additional image data to render updated real-time learning results.

4. The real-time image processing method of claim 1, further comprising:
   updating real-time learning results based on offline object data, offline human identification data, or real-time adaptive learning results from a previous time point.

5. The real-time image processing method of claim 1, wherein the multi-layered mechanism comprises:
   separating each pixel in a holographic AR image into multiple layers; and
   determining each pixel of the holographic AR image based on corresponding pixels in the extracted object or scene, the extracted human object, and the augmented reality (AR) input data based on the projection parameters.

6. The real-time image processing method of claim 1, wherein each pixel of the AR input data is separated into multiple layers.

7. The real-time processing method of claim 1, wherein the one or more object/scene extraction parameters and the one or more human extraction parameters are the same.

8. The real-time image processing method of claim 1, wherein the projection parameters comprise a depth relation, a transparency relation, a positional relation, a visual relation, human interactive control information interpreted from human gesture, a human body movement, a human facial expression, or a combination thereof.

9. A computer system comprising:
   one or more processors; and
   a non-transitory computer-readable medium including one or more sequences of instructions that, when executed by one or more processors, cause the processors to perform operations comprising:
      receiving, at a cluster of servers, real-time image data from an image capturing component;
      extracting one or more objects or a scene from the real-time image data based on results from real-time adaptive learning and one or more object/scene extraction parameters, wherein the real-time adaptive learning comprises object learning, object recognition, object segmentation, scene learning, scene recognition, scene segmentation, or a combination thereof;
      extracting one or more human objects from the real-time image data based on results from real-time adaptive human learning and one or more human extraction parameters, wherein the real-time adaptive human learning comprises human characteristic learning, human recognition, human segmentation, human body movement tracking, or a combination thereof;
      receiving augmented reality (AR) input data; and
      creating holographic AR image data by projecting, for each image, the extracted object or scene, the extracted human object, and the AR input data using a multi-layered mechanism based on projection parameters.

10. The computer system of claim 9, wherein the cluster of servers comprises a single server, a group of servers located a same location, or multiple group of servers located in multiple physical locations.

11. The computer system of claim 9, wherein the operations further comprises:
   continuing to receive additional images constituting the real-time image data while applying real-time error compensation to the image capture component based on the real-time adaptive learning of the image data; and performing the real-time adaptive learning of the additional image data to render updated real-time learning results.

12. The computer system of claim 9, wherein the operations further comprises:
updating real-time learning results based on offline object data, offline human identification data, or real-time adaptive learning results from a previous time point.

13. The computer system of claim 9, wherein the multi-layered mechanism comprises:
separating each pixel in a holographic AR image into multiple layers; and
determining each pixel of the holographic AR image based on corresponding pixels in the extracted object or scene, the extracted human object, and the augmented reality (AR) input data based on the projection parameters.

14. The computer system of claim 9, wherein each pixel of the AR input data is separated into multiple layers.

15. The computer system of claim 9, wherein the projection parameters comprise a depth relation, a transparency relation, a positional relation, a visual relation, human interactive control information interpreted from human gesture, a human body movement, a human facial expression, or a combination thereof.

16. The real-time image processing method of claim 9, wherein the projection parameters comprise a depth relation, a transparency relation, a positional relation, a visual relation, human interactive control information interpreted from human gesture, a human body movement, a human facial expression, or a combination thereof.

17. A non-transitory computer-readable medium including one or more sequences of instructions that, when executed by one or more processors, cause the processors to perform operations comprising:
receiving, at a cluster of servers, and from an image capturing component, real-time image data;
extracting one or more objects or a scene from the real-time image data based on results from real-time adaptive learning and one or more object/scene extraction parameters, wherein the real-time adaptive learning comprises object learning, object recognition, object segmentation, scene learning, scene recognition, scene segmentation, or a combination thereof;
extracting one or more human objects from the real-time image data based on results from real-time adaptive human learning and one or more human extraction parameters, wherein the real-time adaptive human learning comprises human characteristic learning, human recognition, human segmentation, human body movement tracking, or a combination thereof;
receiving augmented reality (AR) input data; and
creating holographic AR image data by projecting, for each image, the extracted object or scene, the extracted human object, and the AR input data using a multi-layered mechanism based on projection parameters.

18. The non-transitory computer-readable medium of claim 17, wherein the cluster of servers comprises a single server, a group of servers located a same location, or multiple group of servers located in multiple physical locations.

19. The non-transitory computer-readable medium of claim 17, wherein the operations further comprises:
continuing to receive additional images constituting the real-time image data while applying real-time error compensation to the image capture component based on the real-time adaptive learning of the image data; and
performing the real-time adaptive learning of the additional image data to render updated real-time learning results.

20. The non-transitory computer-readable medium of claim 17, wherein the operations further comprises:
updating real-time learning results based on offline object data, offline human identification data, or real-time adaptive learning results from a previous time point.

21. The non-transitory computer-readable medium of claim 17, wherein the multi-layered mechanism comprises:
separating each pixel in a holographic AR image into multiple layers; and
determining each pixel of the holographic AR image based on corresponding pixels in the extracted object or scene, the extracted human object, and the augmented reality (AR) input data based on the projection parameters.

22. The non-transitory computer-readable medium of claim 17, wherein each pixel of the AR input data is separated into multiple layers.

23. The non-transitory computer-readable medium of claim 17, wherein the one or more object/scene extraction parameters and the one or more human extraction parameters are the same.

24. The non-transitory computer-readable medium of claim 17, wherein the projection parameters comprise a depth relation, a transparency relation, a positional relation, a visual relation, human interactive control information interpreted from human gesture, a human body movement, a human facial expression, or a combination thereof.

* * * * *